(12) United States Patent
Hagler

(10) Patent No.: US 6,897,952 B1
(45) Date of Patent: *May 24, 2005

(54) METHOD AND APPARATUS FOR SPECTRUM ANALYSIS AND ENCODER

(75) Inventor: Thomas W. Hagler, Grass Valley, CA (US)

(73) Assignee: Advanced Photometrics, Inc., Grass Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/869,371

(22) PCT Filed: Jun. 25, 1999

(86) PCT No.: PCT/US99/14446

§ 371 (c)(1),
(2), (4) Date: Feb. 26, 2002

(87) PCT Pub. No.: WO00/00796

PCT Pub. Date: Jan. 6, 2000

Related U.S. Application Data

(63) Continuation-in-part of application No. 09/105,279, filed on Jun. 26, 1998.

(51) Int. Cl.⁷ .............................. G01J 3/04; G01J 3/433
(52) U.S. Cl. ........................ 356/310; 356/323; 356/326
(58) Field of Search ................................ 356/310, 323, 356/326, 330

(56) References Cited

U.S. PATENT DOCUMENTS

| | | |
|---|---|---|
| 3,563,654 A | 2/1971 | Vernande |
| 3,578,980 A | 5/1971 | Decker |
| 3,586,442 A | 6/1971 | Tripp |
| 3,636,062 A | 1/1972 | Girard |
| 3,640,625 A | 2/1972 | Ibbett |
| 3,811,777 A * | 5/1974 | Chance .................. 356/73 |

(Continued)

FOREIGN PATENT DOCUMENTS

| | | |
|---|---|---|
| GB | 672758 A | 5/1952 |
| WO | WO 97/31245 | 8/1997 |

OTHER PUBLICATIONS

"Static Multislit Spectroscopy and Its Application to the Panoramic Display of Infrared Spectra," Marcel J.E. Golay, Journal of the Optical Society of America, vol. 41, No. 7, Jul. 1951, pp. 468–472.

"Multi–Slip Spectrometry," Marcel J.E. Golay, Journal of the Optical Society of America, vol. 39, No. 6, Jun. 1949, pp. 437–444.

"A Multiplex Grating Spectrometer", J.F. Grainger et al., Journal de Physique, Colloque C2, supplemental au No. 3–4, Torne 28, Mars–Avril 1967, pp. C2–44–C2–52.

Search Report mailed Oct. 21, 1999.

International Search Report mailed Jan. 11, 2000.

*Primary Examiner*—Zandra V. Smith
(74) *Attorney, Agent, or Firm*—Fenwick & West LLP

(57) ABSTRACT

A disc serving as a spatial radiation modulator has dispersed radiation filters thereon. Each filter has a transmittance or reflectance modulation function of the form $\sin^2(m\theta+p\pi/4)$, where m is a positive integer and p has one of the four values 0, 1, 2, 3. A radiation beam including selected wavelength components is diffracted into an elongated image dispersed according to wavelength. Different wavelength components are focused onto different filters on the modulator and are encoded by corresponding filters. Since the modulation functions of the filters are orthogonal to one another, it is possible to extract the amplitude of each wavelength component after it has been encoded or modulated by corresponding filter from the total detected signal during one measurement.

27 Claims, 19 Drawing Sheets

U.S. PATENT DOCUMENTS

| | | | |
|---|---|---|---|
| 3,922,092 A | * 11/1975 | van den Bosch | ........... 356/332 |
| 4,007,989 A | 2/1977 | Wajda | |
| 4,264,205 A | 4/1981 | Landa | |
| 4,304,491 A | 12/1981 | Kraushaar et al. | |
| 4,448,529 A | * 5/1984 | Krause | ....................... 356/310 |
| 4,450,459 A | 5/1984 | Turner et al. | |
| 5,024,508 A | 6/1991 | Horner | |
| 5,090,807 A | 2/1992 | Tai | |
| 5,121,239 A | 6/1992 | Post | |
| 5,235,461 A | 8/1993 | Kirsch | |
| 5,325,324 A | 6/1994 | Rentzepis | |
| 5,483,335 A | 1/1996 | Tobias | |
| 5,485,268 A | 1/1996 | Tobias | |
| 5,504,575 A | 4/1996 | Stafford | |
| 5,537,303 A | 7/1996 | Stacy | |
| 5,579,105 A | 11/1996 | Belton | |
| 5,592,327 A | 1/1997 | Gabl | |
| 5,691,886 A | 11/1997 | Stacy | |
| 5,748,308 A | 5/1998 | Lindberg | |
| 5,991,460 A | 11/1999 | Mitchell | |
| 6,011,640 A | 1/2000 | Hutton | |
| 6,018,402 A | 1/2000 | Campbell | |
| 6,101,034 A | 8/2000 | Cox | |
| 6,271,917 B1 | * 8/2001 | Hagler | ........................ 356/310 |
| 6,388,794 B2 | * 5/2002 | Hagler | ........................ 359/236 |
| 2004/0021078 A1 | 2/2004 | Hagler | |

* cited by examiner

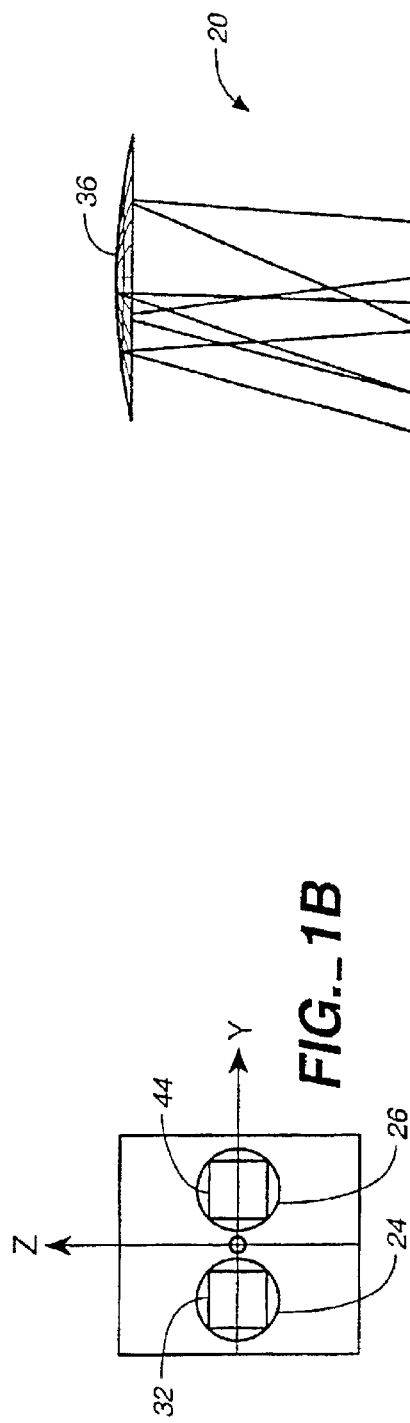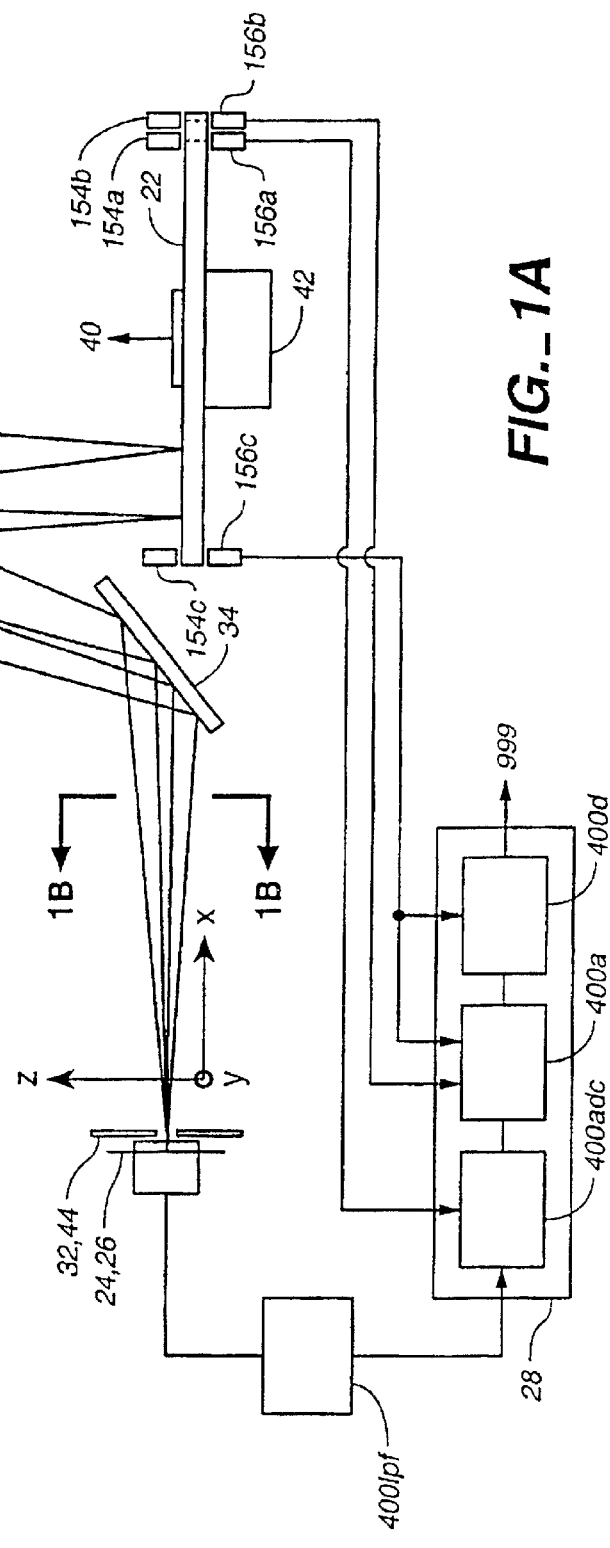

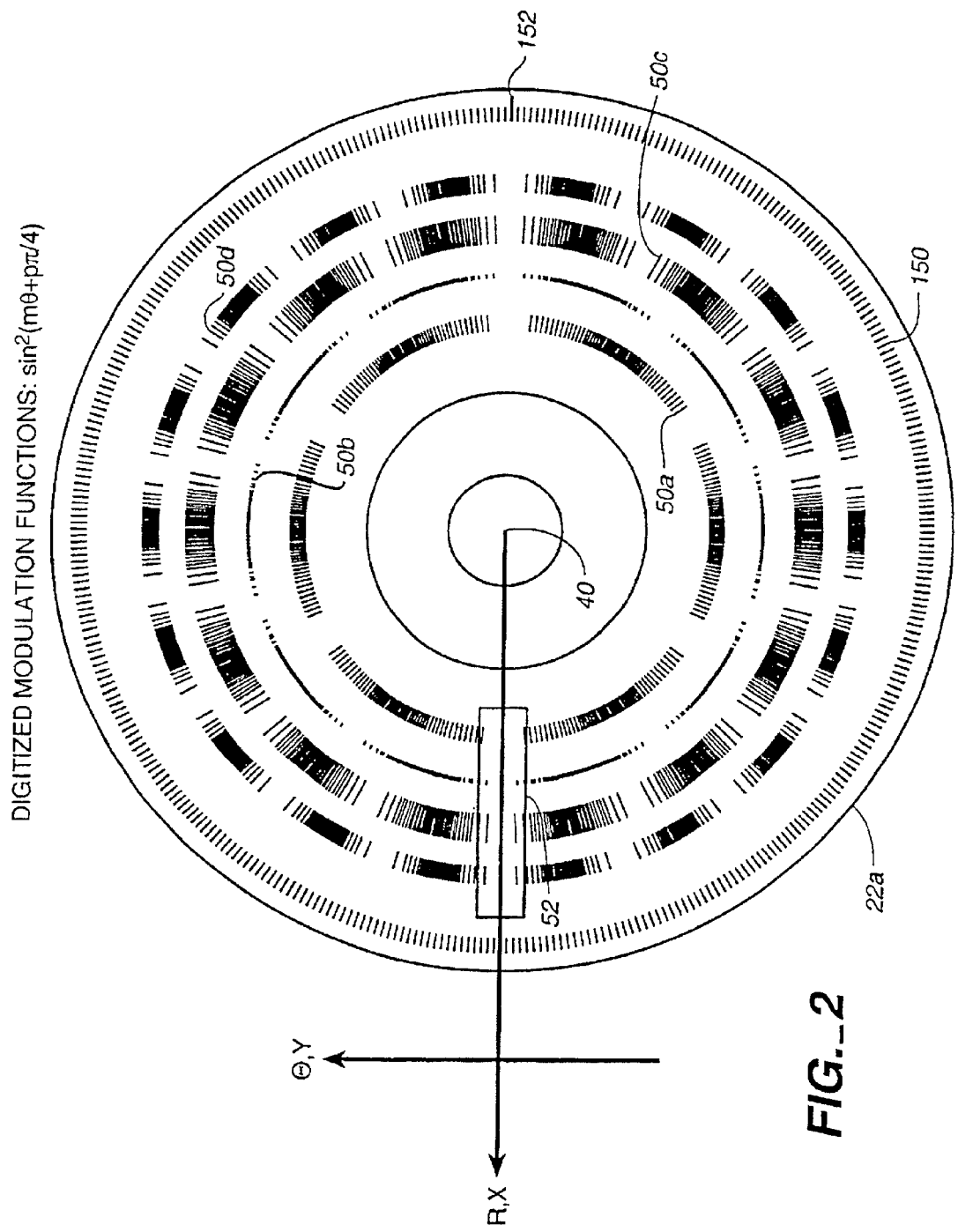
FIG._2

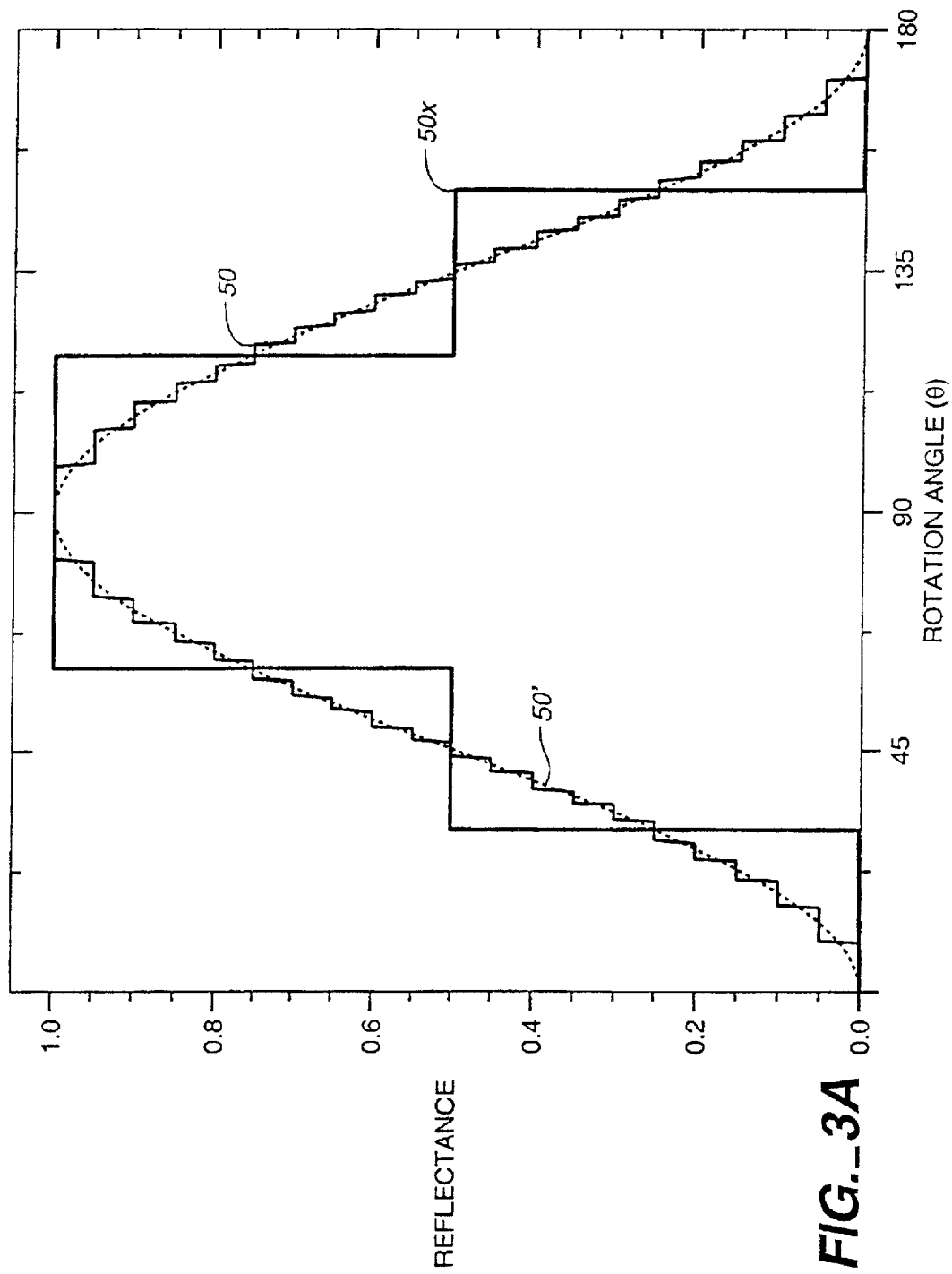
FIG._3A

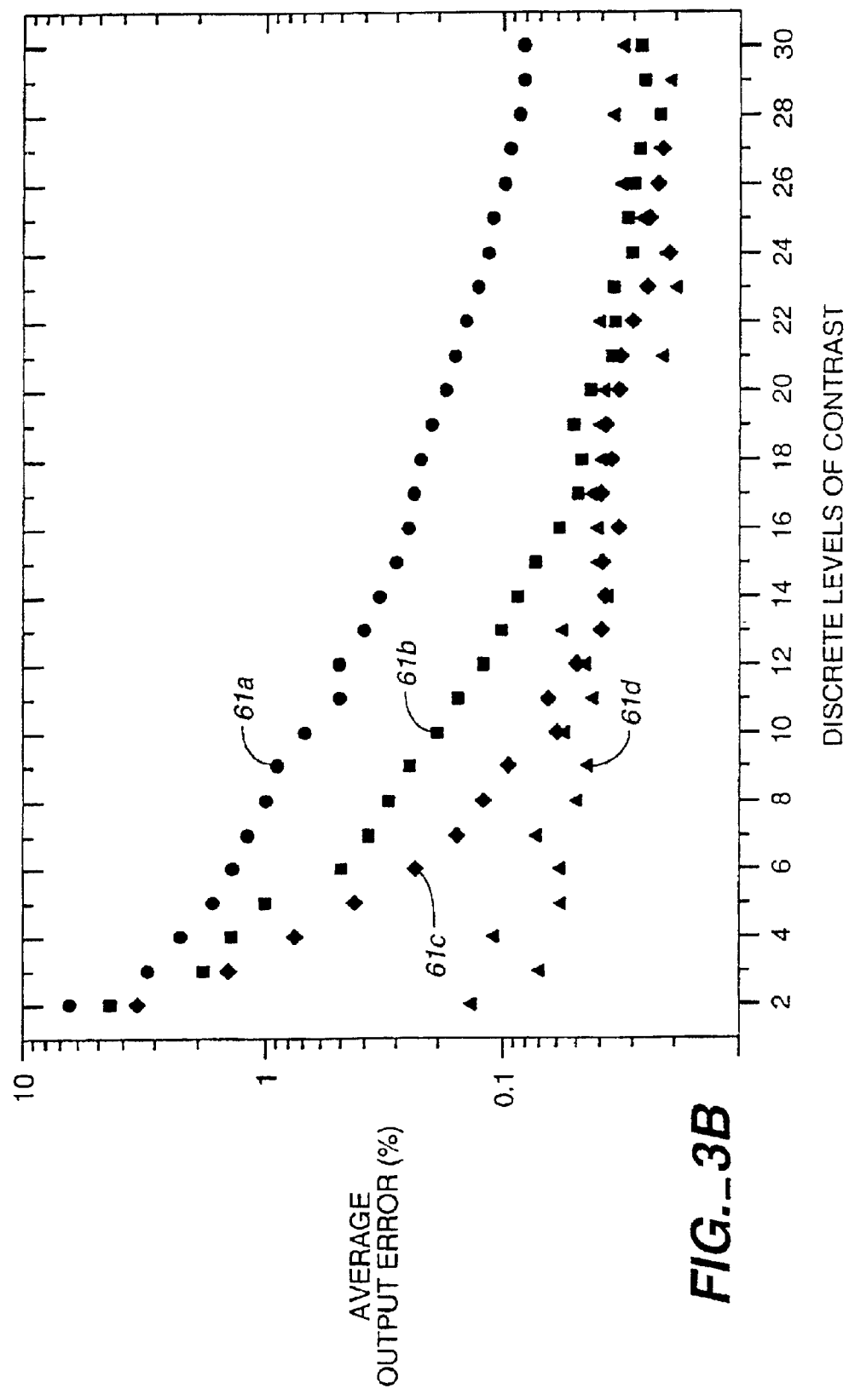
FIG._3B

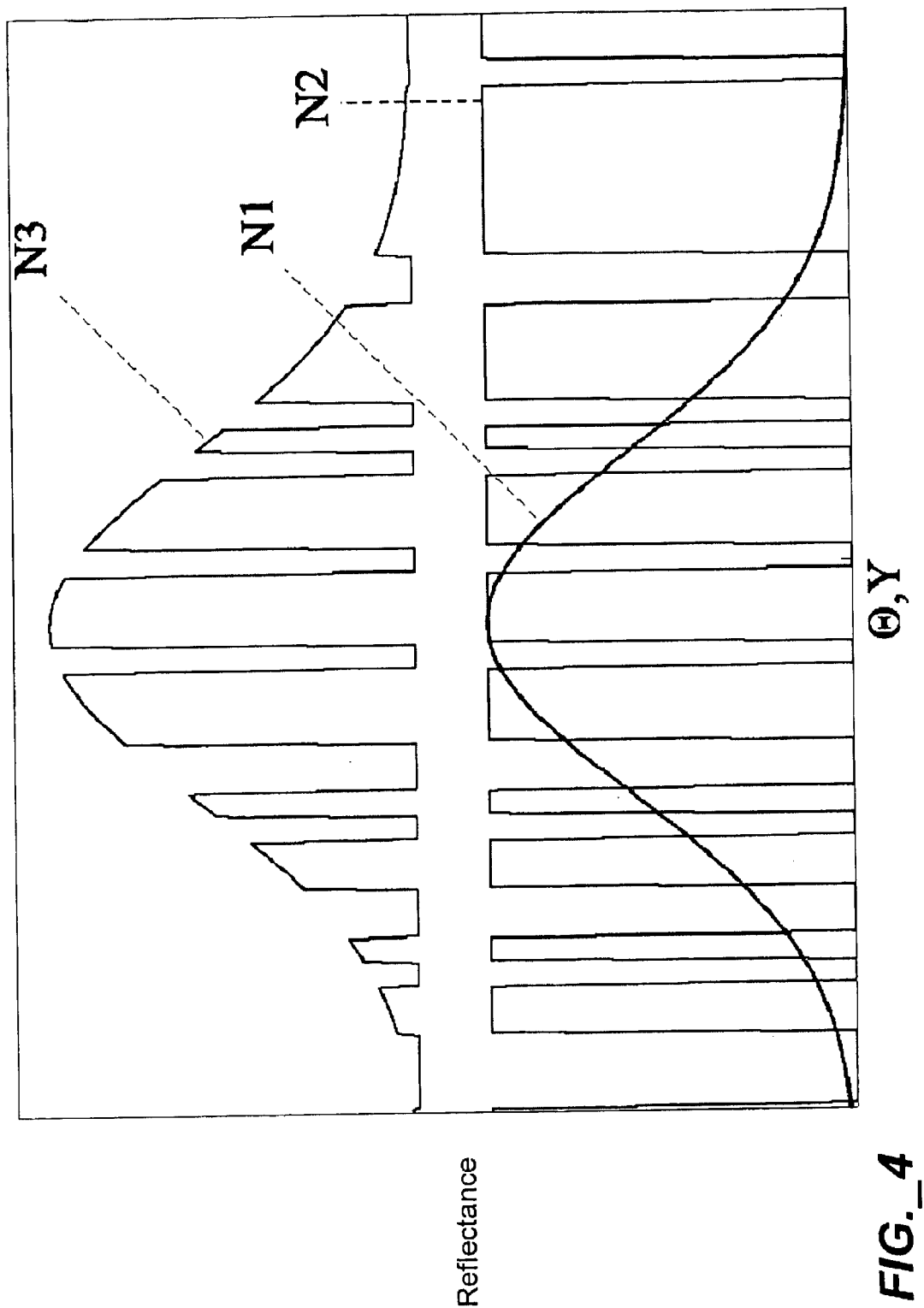
FIG._4

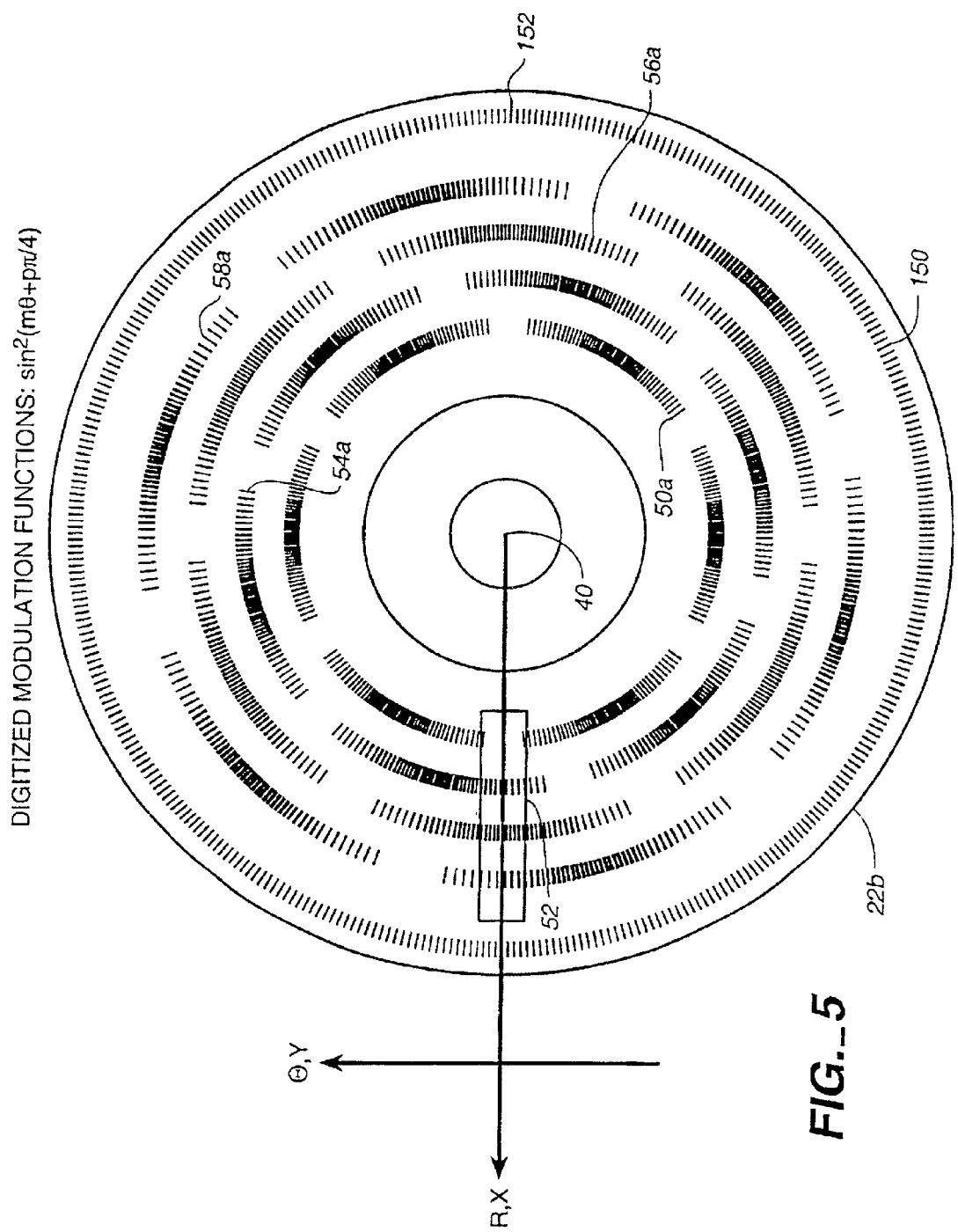
FIG._5

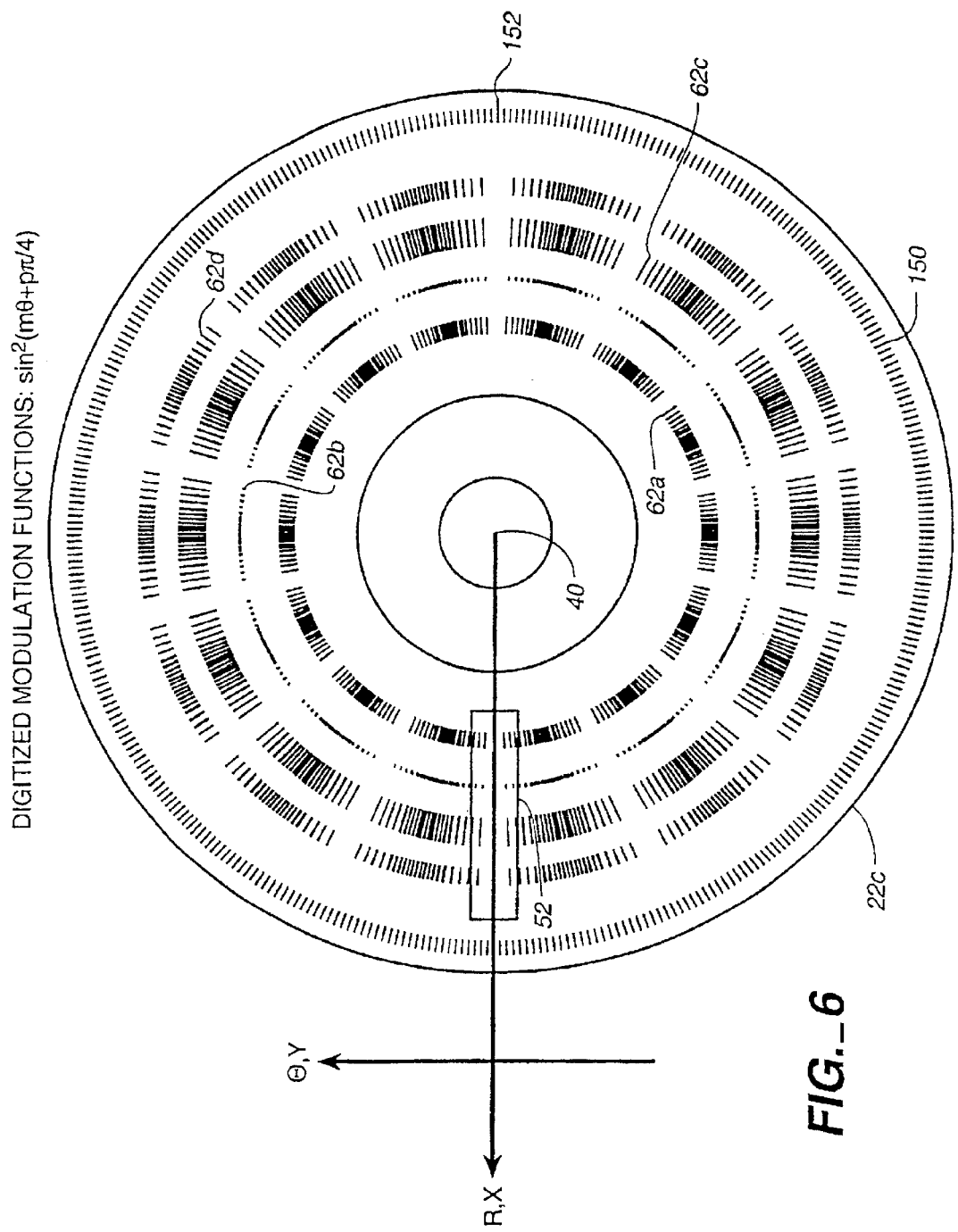
FIG._6

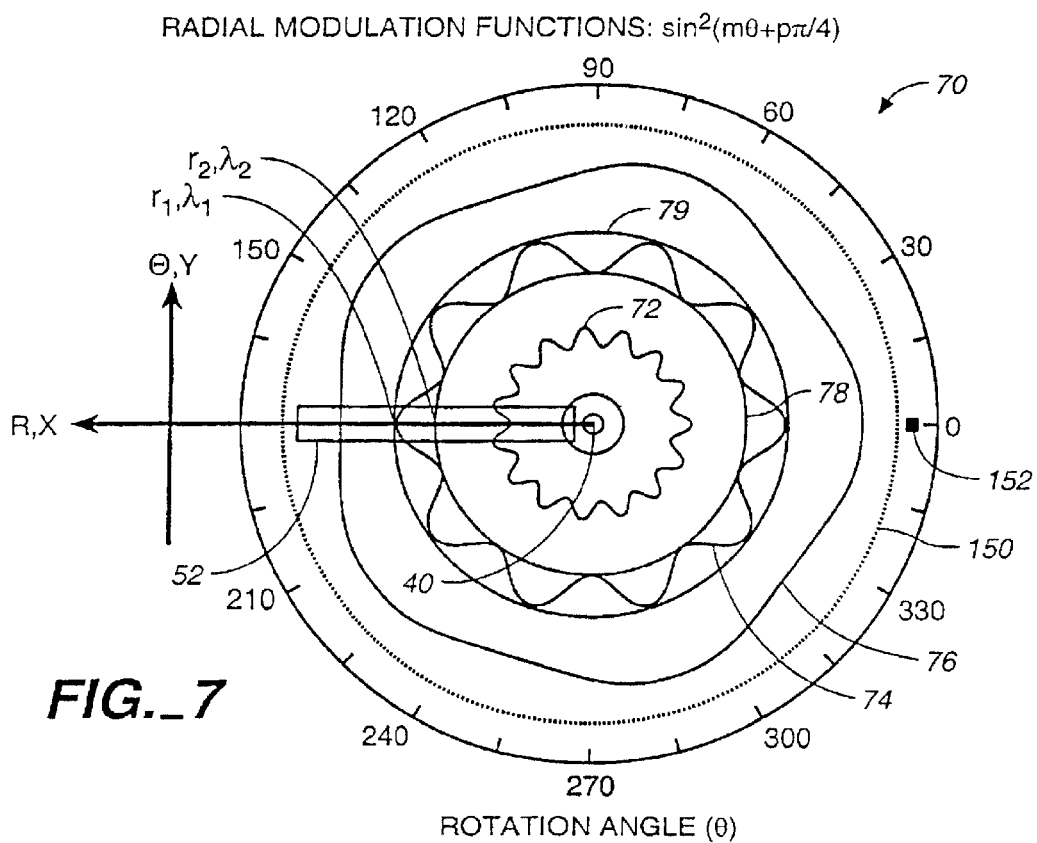
FIG._7
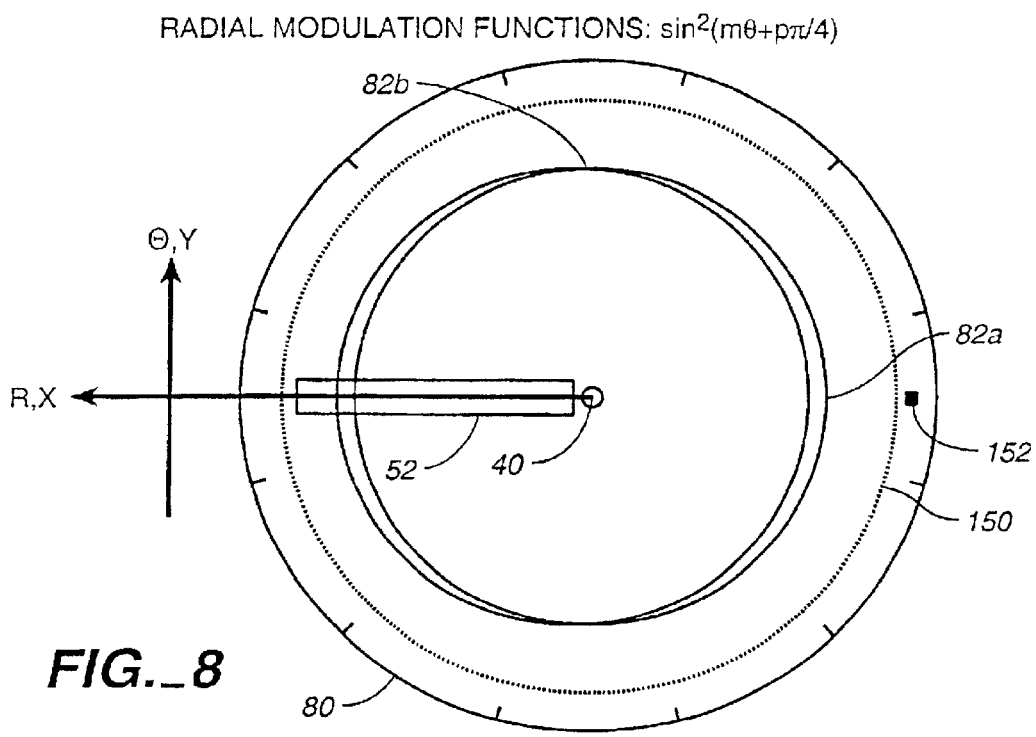
FIG._8

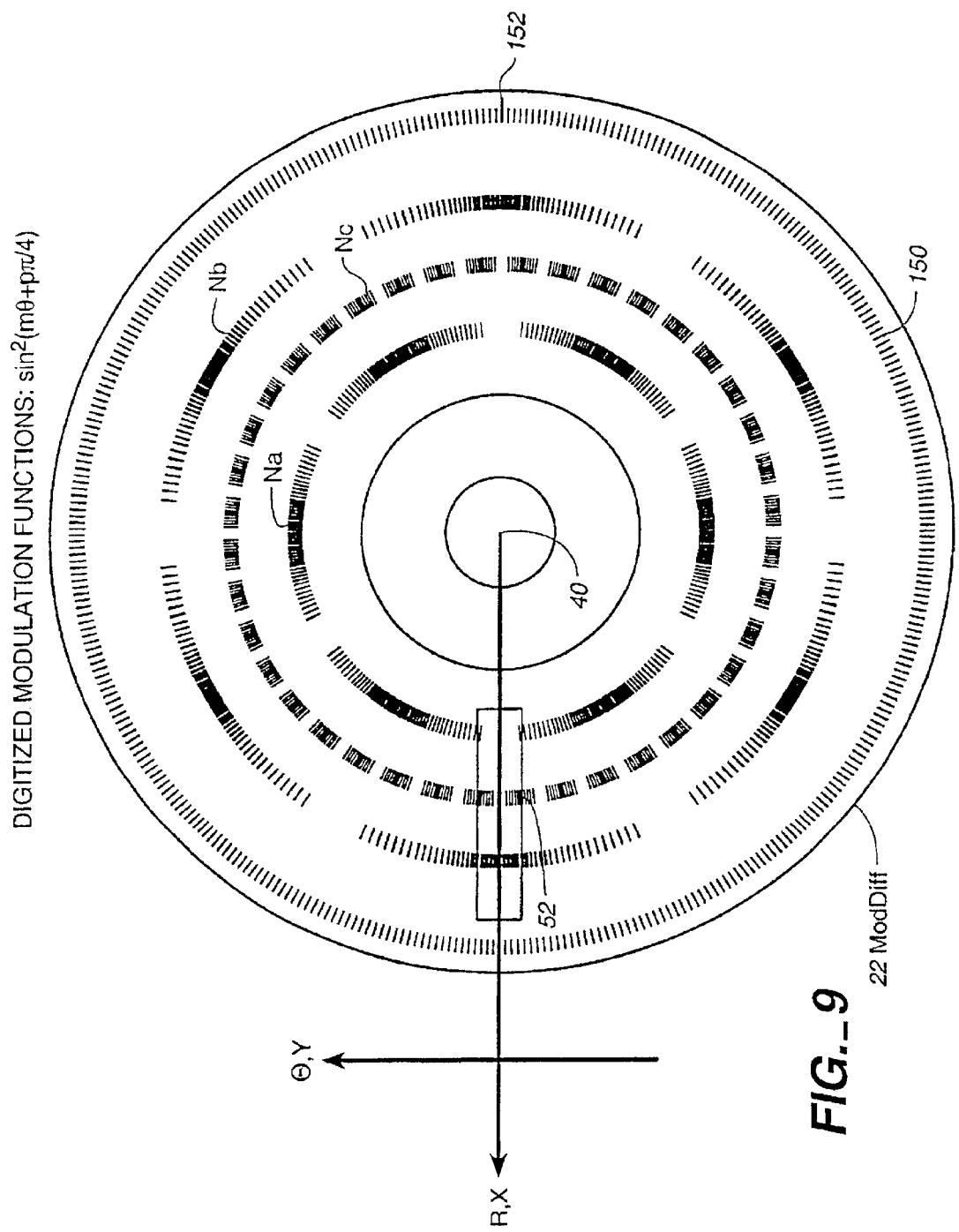
FIG._9

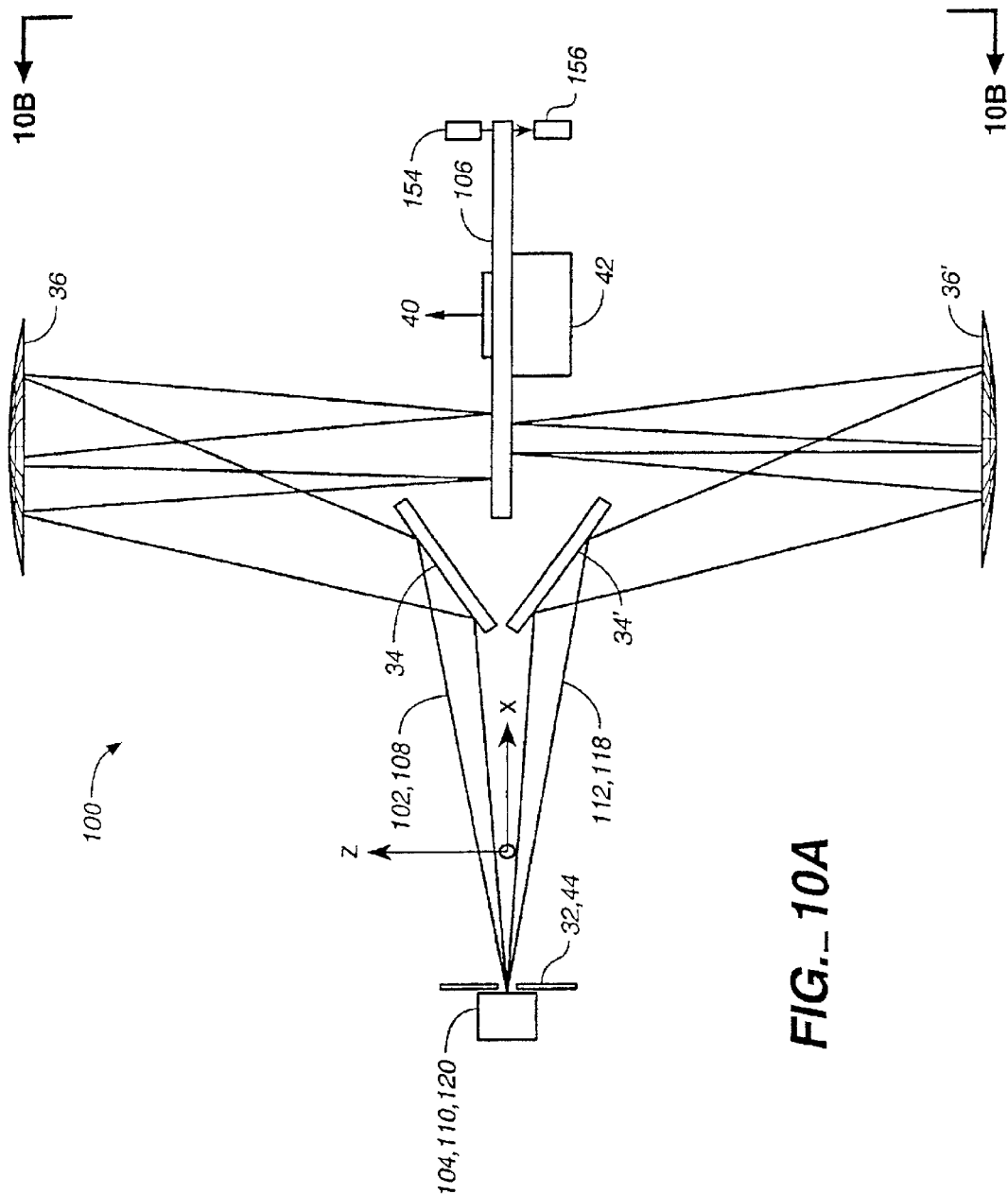
FIG._10A

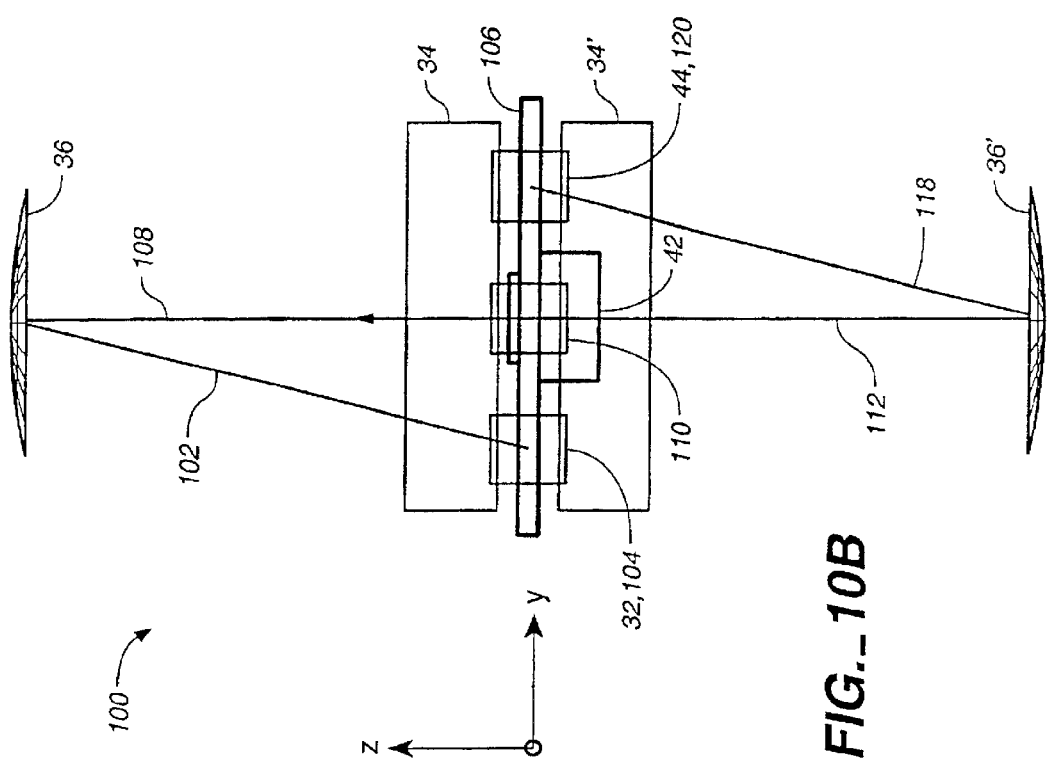
FIG._10B

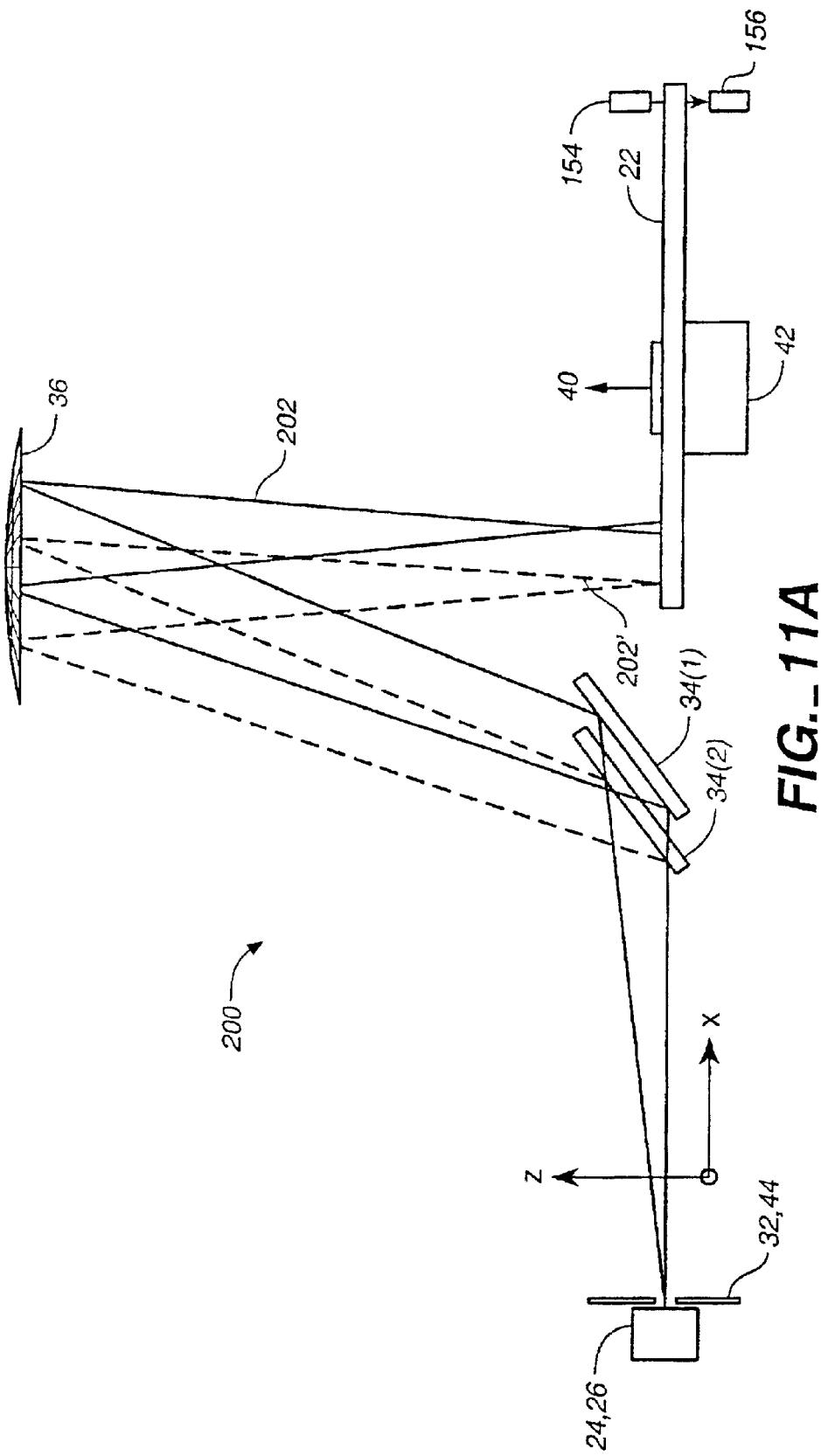
FIG._11A

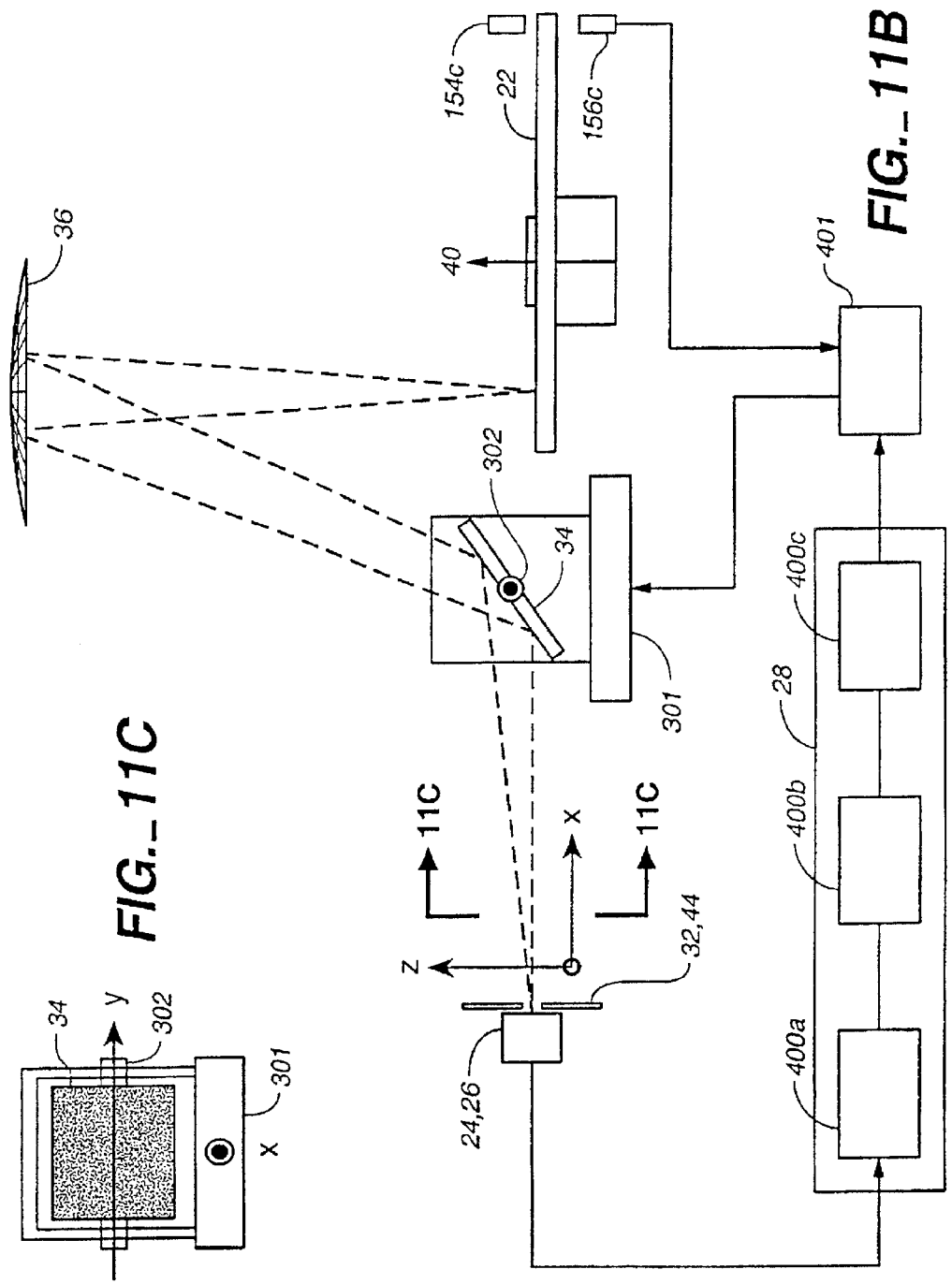

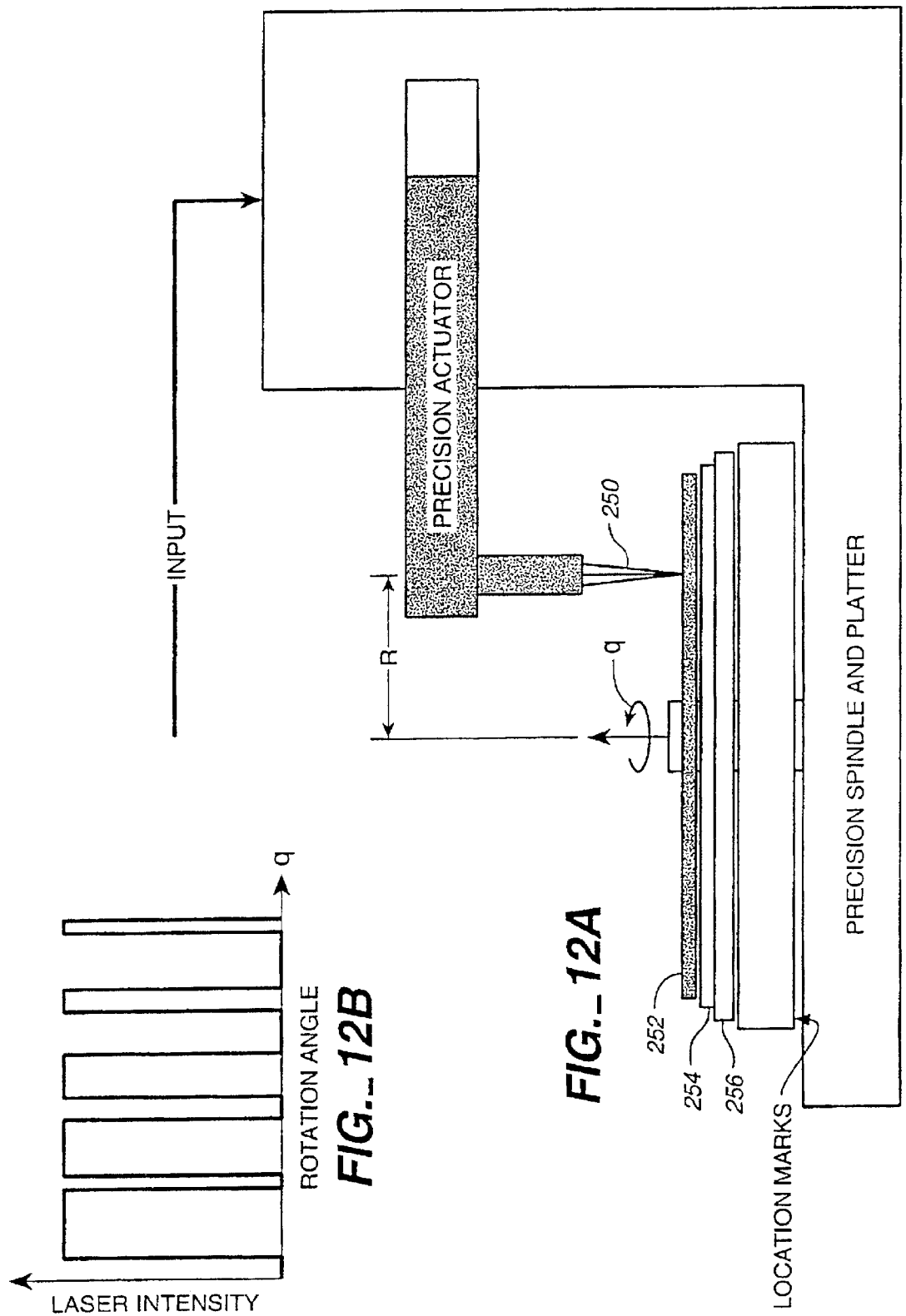

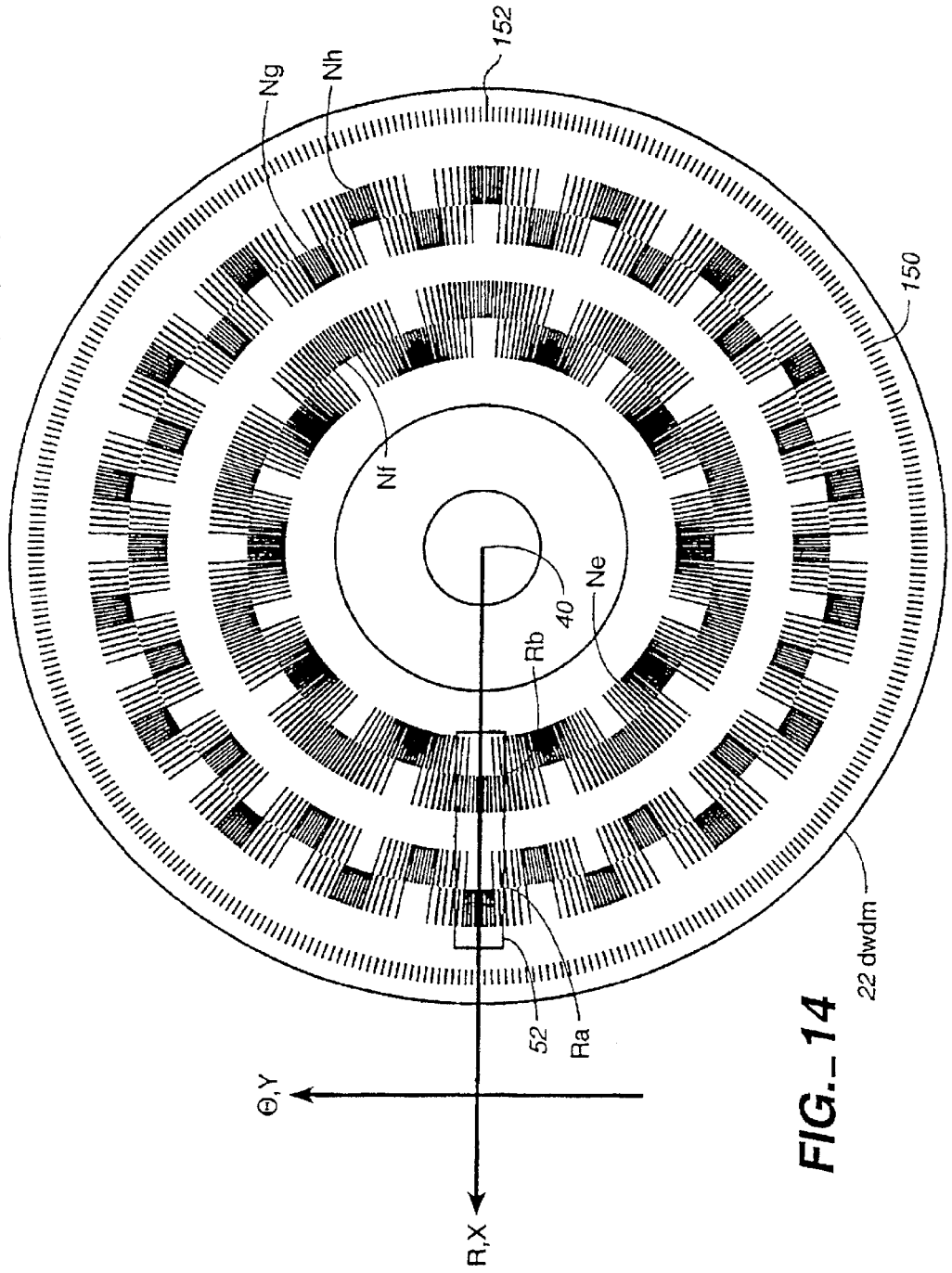
FIG._14

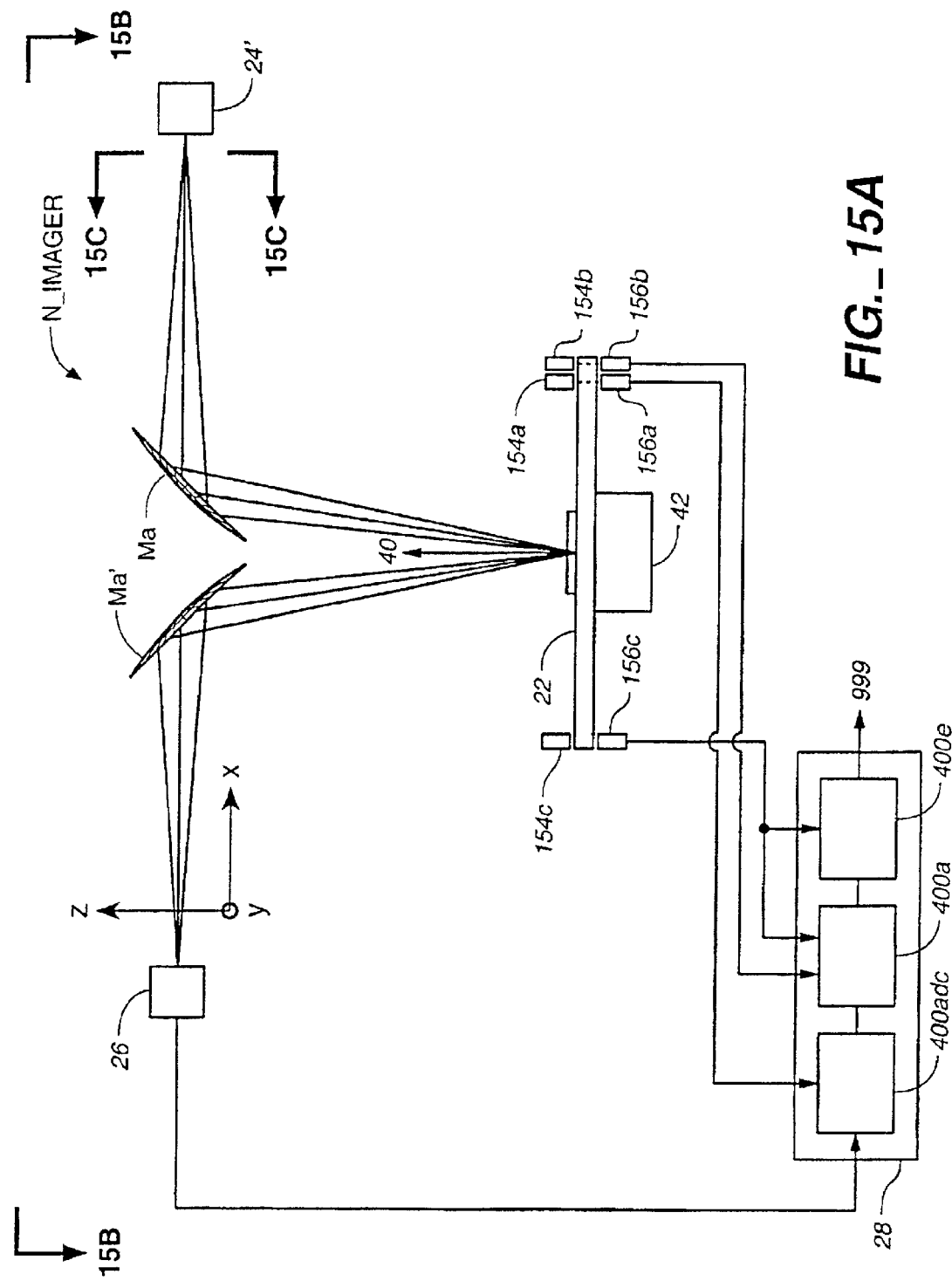
FIG._15A

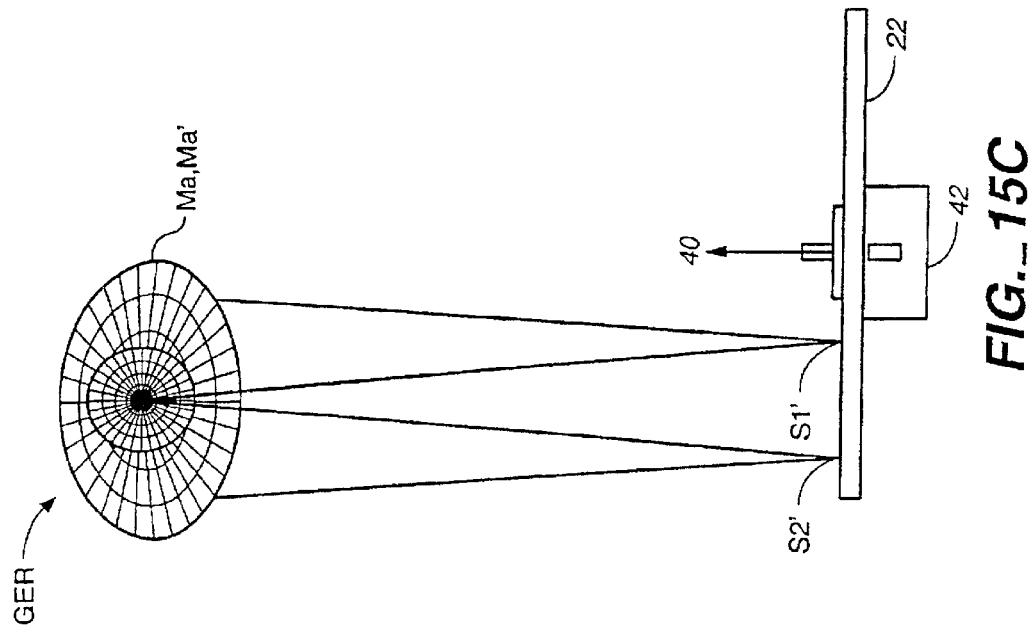
FIG._15C
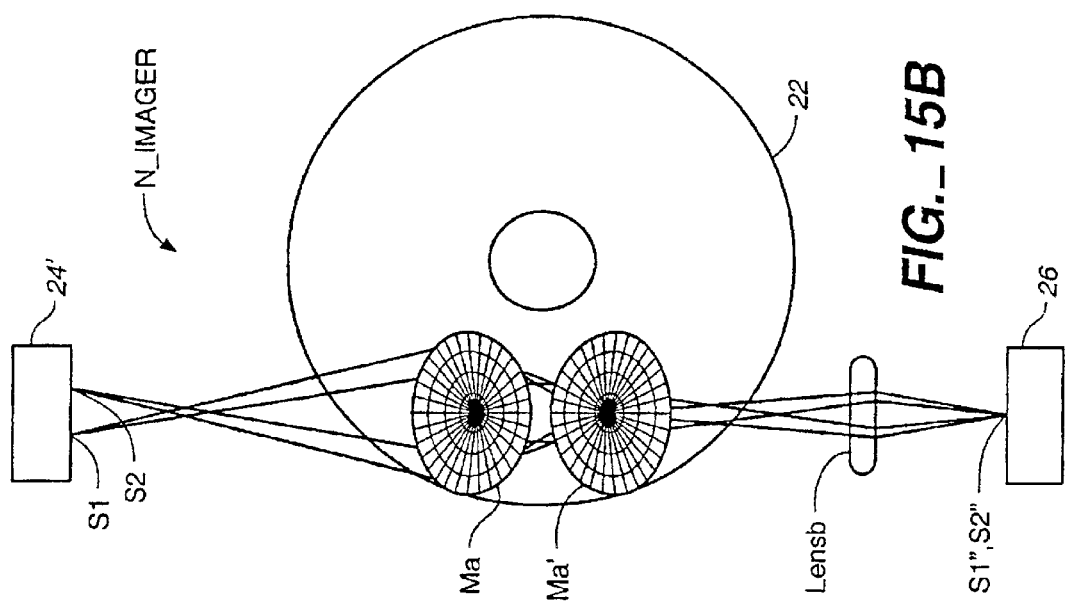
FIG._15B

METHOD AND APPARATUS FOR SPECTRUM ANALYSIS AND ENCODER

CROSS REFERENCE TO RELATED APPLICATION

This application is a continuation-in-part of copending U.S. patent application Ser. No. 09/105,279, filed Jun. 26, 1998 which is a continuation-in-part of International Patent Application No. PCT/US99/14446, filed Jun. 25, 1999 (designating the United States) which takes priority from U.S. patent application Ser. No. 09/105,279, filed Jun. 26, 1998.

BACKGROUND OF THE INVENTION

This invention relates in general to spectrum analyzers and in particular, to a spectrum analyzer and encoder employing spatial modulation of radiation dispersed by wavelength or imaged along a line.

Radiation spectral analysis is presently carried out in a number of ways. Dispersive and Fourier transform based analyzers are for high resolution and can be used for many different applications so that they are more versatile than existing application-specific instruments and procedures. While these analyzers offer superior spectral performance, they tend to be expensive, slow and are not portable. For most applications, these instruments offer a resolution which is largely unnecessary. Many applications require measurements only at several wavelengths so that most of the data taken over the entire complete spectrum using these instruments is discarded and not used at all in the analytical computations. Such analyzers may also be too large and heavy for many practical applications.

In contrast, a non-dispersive approach to spectral analysis employs interference filters of fixed frequency passbands to perform given analytical functions. To perform the measurement, the light signal containing a number of wavelength components is propagated through one or more interference filters which are characterized by a center wavelength and bandwidth. The non-dispersive approach is advantageous over the Fourier transform and dispersive spectrum analyzers in that the non-dispersive approach is less expensive and measures the minimum amount of spectral data required to perform a given analytical function. However, if the analytical function requires a significant number of filters, the system's signal-to-noise ratio is reduced as the total energy measured in a given filter over time is inversely related to the number of filters. Furthermore, if a spectrum analyzer using this approach is configured for a first application, the filters used in the device may have to be replaced, or the number of filters changed, in order to adapt the analyzer to a second application. Therefore, even though the non-dispersive approach may be less expensive and does not measure unnecessary data as compared to the dispersive and Fourier transform approaches, the present non-dispersive approach has clear limitation in adaptability and the number of wavelength which can be analyzed.

Another type of optical spectrum analyzer, which is best described as a hybrid between dispersive and non-dispersive instruments, is the Hadamard spectrometer. The Hadamard spectrometer includes a spatial light modulator, comprised of a disc made of an opaque material with slots therein that reflect or transmit light, where the slots have uniform transmittance or reflectance. A light beam is dispersed according to wavelength onto the disc and the slots are selectively spaced at different radii from the axis to form a number of different optical channels for detecting corresponding wavelength components of the beam. The disc is rotated about the axis and the slots selectively encode the corresponding wavelength components with a binary amplitude modulation. The encoded beam is then directed to a detector. In order to differentiate the intensity of the wavelength component transmitted or reflected by one slot from that of another, the disc is sequentially stepped through a specific number of steps, each step comprised of a binary pattern of open or closed optical channels, which defines one equation in a system of simultaneous equations for the amplitudes of the wavelength components. This set of simultaneous equations is then solved to yield the intensity for each channel prior to any specific analytical function, an approach which is cumbersome and time consuming. Furthermore, as a direct consequence of the binary encoding approach, there is no mechanism by which one can recover the actual signal levels if any one of the signal levels changes substantially over the period of rotation. It should be noted that the system of equation can be simplified if the slots are patterned such that the light is transmitted or blocked one wavelength component at a time. However, this approach changes the optical duty cycle of each of the wavelength components from its optimum value of 50%, thereby degrading the signal to noise ratio. Finally, if a Hadamard analyzer is configured for a first application, and the number of slots is changed to adapt the analyzer to a second application, the data acquisition and decoding algorithms must be changed as well, which significantly limits the instrument's adaptability.

None of the above approaches is entirely satisfactory. It is, therefore, desirable to provide an improved spectrum analyzer where the above-noted disadvantages are avoided or significantly diminished, in particular, where the encoding, data acquisition and demodulation are both generalized and significantly simplified such that the details of the spectrum analyzer can be rendered to a single application specific hardware component.

SUMMARY OF THE INVENTION

This invention provides many advantages over the conventional Hadamard disc described above. In some embodiments for certain applications, this invention enables the amplitudes of wavelength components to be encoded as digitized replicas of smooth functions which render the encoded wavelength components substantially orthogonal to one another. In this manner, one can preserve the ideal 50% duty cycle, eliminate the time consuming practice of solving a system of simultaneous equations to deconvolve the encoded signal, and the decoded signal is largely insensitive to transients which may occur in one or more of the wavelength components during a data acquisition cycle. In addition, the number of data acquisition steps becomes arbitrary which allows one to use a more generalized approach to decoding the optical signal. For this purpose, the modulation functions of the filters employed are such that they cause the amplitudes of given modulated wavelength components to change between three or more distinct levels of contrast as the modulator is rotated about an axis or otherwise displaced, the preferred configuration having the largest number of distinct levels of contrast that is practical.

In many practical embodiments, digitized versions or replicas of the smooth functions may be used instead of analog ones while retaining most of the advantages of the invention. The small interference effects caused by digitization can either be ignored, or accounted for and corrected as required by the application. The modulation functions of two dispersed radiation filters for two different channels are considered to be substantially orthogonal to each other when it is possible to differentiate the contribution to the detector signal caused by the wavelength component in one of the two channels from that caused by the wavelength component in the other channel without having to solve a simultaneous system of equations. The definition also allows for a finite number of corrections to compensate for the effects of digitization. As explained below, for different applications, this definition may be applied differently. In this manner, the time and effort required to decode the amplitude coefficients is greatly reduced. Furthermore, the modulators can be made with filters specifically adapted for certain analytical functions. If modulators with different characteristics are called for to perform a different analytical function, it is a simple matter to replace the modulator by one with the desired properties without altering the system apparatus. Another advantage of the invention lies in that the filters of a modulator are at fixed spatial relationship to each other, so that wavelength calibration is reduced in determining the alignment of the dispersed image onto the radius of the disc.

One embodiment of the spectrum analyzer of this invention according to one aspect of the invention comprises a source providing radiation, where the radiation includes a plurality of selected wavelength components. Radiation from the source is collected, dispersed and focused to form an image dispersed by wavelength onto a plane. A two-dimensional spatial modulator positioned in the plane modulates amplitudes of the wavelength components to encode each component, such that the amplitude of each encoded component has three or more distinct levels of contrast as a function of time. The encoded beam is collected and directed towards a detector and signals generated by the detector are sampled and analyzed. Preferably, at least two of the modulation functions for encoding two corresponding wavelength components have the optimum 50% duty cycle and are substantially orthogonal, so that the amplitudes of the two encoded components present in the total detector signal may be distinguished from each other without solving a system of simultaneous equations. Preferably, the modulator is rotated about an axis or otherwise reciprocated in a direction, where the modulator modulates the wavelength components so that the amplitude of each encoded component has three or more distinct levels of contrast as a function of time. More preferably, at least two of the modulation functions of the modulator have the optimum 50% duty cycle and are substantially orthogonal along an azimuthal axis relative to the rotation.

Another aspect of the invention and useful for the above-described spectrum analyzer is a two-dimensional spatial radiation modulator adapted to be rotated about an axis. The modulator has a plurality of radiation filters at different radii from the axis for modulating amplitudes of different wavelength components of an incident radiation beam to encode the beam, so that the amplitude of each encoded component is a function of a rotation angle of the modulator about the axis. Preferably, one or more of the filters has a modulation function that encodes the amplitude of the corresponding component so that the encoded component has three or more distinct levels of contrast over time when the modulator is rotated about the axis. More preferably, the modulation functions are smooth functions or digitized replicas thereof, obtained by rounding up or rounding down to a finite number of levels of contrast, and the modulation functions of two filters for modulating two different wavelength components have the optimum 50% duty cycle and are substantially orthogonal. In the preferred embodiment, the modulator contains a series of timing marks and the analyzer has a number of optical switches which are triggered by the timing marks to establish the absolute angle of rotation for decoding purposes. Most preferably, the timing marks will also trigger the data acquisition from the detector and the decoding algorithm, which in turn, will substantially relax the requirements on the stability of the modulators rotational period. Preferably, the analyzer will have a dedicated radiation source and an analog detector which is partially interrupted by the timing marks to detect platter wobble or a misaligned pattern on the modulator. More preferably, the signal generated by the analog detector would be used as input by the decoding algorithm or the analytical function to compensate for the undesired effects of platter wobble or a misaligned pattern. Most preferably, the signal generated by the analog detector would be used as input to control the position of one or more optical elements to keep the diffracted image centered on the modulator pattern. Preferably, the analyzers operating system will include an algorithm which will detect transients in the signal levels of the wavelength components which occur during a rotational period of the modulator. Most preferably, the algorithm will include a feedback mechanism to increase the motor speed in response to the detection of sub-rotational-period signal transients and decrease the motor speed in response to extended periods of time where the signal is stable.

Another two-dimensional spatial radiation modulator that will be useful for spectral analysis includes a two-dimensional spatial radiation modulator adapted to be rotated about an axis, or otherwise reciprocated in a direction. The modulator includes at least one pair of radiation filters which are out of phase such that the signal resulting from the filter pair can be nulled by balancing the intensity of the light which is incident on the two filters. In that manner, the difference in the light intensity incident on the two filters can be measured directly, rather than inferring the difference by subtraction, an inefficient approach which wastes dynamic range of the analog to digital converter (ADC) in the event that such a converter is used. Preferably, one or more of the filter pairs has a modulation function that encodes the amplitude of the corresponding component difference so that the encoded component difference has three or more distinct levels of contrast over time when the modulator is rotated about the axis. More preferably, the modulation functions are smooth functions or digitized replicas thereof, obtained by rounding up or rounding down to a finite number of levels of contrast, such that the modulation functions of two filter pairs for modulating two different wavelength component differences have the optimum 50% duty cycle and are substantially orthogonal.

Another two-dimensional spatial radiation modulator that will be useful for spectral analysis includes a two-dimensional spatial radiation modulator adapted to be rotated about an axis, or otherwise reciprocated in a direction. The modulator has at least one dispersed radiation filter being in the shape of a band surrounding the axis, where the radial position of the band is modulated between two different radii from the axis, such that the center wavelength of the reflected radiation is modulated between two different wavelengths when the modulator is rotated about the axis. Preferably the band is serpentine in shape.

Another two-dimensional spatial radiation modulator useful for spectral analysis is adapted to be rotated about an axis. The modulator has at least one dispersed radiation filter in the shape of a substantially continuous band around the axis, where the band has a width that varies as a function of a rotational angle of the modulator about the axis, to modulate the bandwidth of the reflected radiation.

In another embodiment of the invention, a spectrum analyzer for analyzing a sample comprises a source to provide excitation radiation comprised of a first plurality of wavelength components, and means for collecting, dispersing and focusing a beam of radiation from the excitation source to form a first image dispersed by wavelength onto a first plane. A first two-dimensional spatial radiation modulator is positioned in the first plane to modulate the amplitude of the first plurality of wavelength components, where such amplitudes are periodically modulated using three or more distinct levels of contrast. The encoded excitation beam is collected and focused onto the sample, causing the sample to emit or scatter a beam of radiation. The emitted or scattered beam of radiation from the sample is collected and focused to form a second image dispersed by wavelength onto a second plane. A second two-dimensional spatial radiation modulator positioned in the second plane modulates the amplitudes of a second plurality of wavelength components in said emitted or scattered beam to encode such beam, where such amplitudes are periodically modulated using three or more distinct levels of contrast. The encoded emitted or scattered beam is collected and focused onto a detector and a time-based signal generated by the detector is analyzed for cross-modulation phenomena.

In some applications, it may be desirable to measure certain characteristics of a sample when excited by radiation from two or more different excitation sources. Some samples are such that the results of the measurements may differ depending upon which source is first used in a sequence of measurements employing different excitation sources. Thus, measurement of the sample using one excitation source may cause a change in the sample that will affect its measurement by means of another excitation source.

For such applications, it may be desirable to measure the sample by means of two or more different excitation sources substantially simultaneously, where each source provides radiation in a corresponding wavelength range. For this purpose, radiation is provided from two or more excitation sources where the radiation comprises wavelength components in two or more corresponding ranges of wavelengths. Radiation from the sources are directed to a sample such that excitation radiation in not more than one of the ranges is directed to the sample at a time. In response to excitation radiation, the sample emits, transmits or scatters radiation. After such emitted, transmitted or scattered radiation has been encoded by the modulator, the encoded radiation is detected in a manner such that the contribution to the detector signal caused by radiation from each of the sources may be distinguished from contributions to the signal by the other sources. In this manner, the characteristics of the sample emission, transmission or scattering may be measured by means of radiation in different ranges of wavelengths from different excitation sources substantially simultaneously. Preferably, at least two of the modulation functions of the modulator are substantially orthogonal to one another and have the optimum 50% duty cycle. In the preferred embodiment, annular regions each comprising a series of optical gates may be provided in a peripheral region of the modulator to sequentially pass radiation from the excitation sources to the sample in a manner which synchronizes the data acquisition with the opening of the optical gates so that data acquired by means of radiation from one excitation source may be distinguished from those acquired using radiation from other excitation sources. Preferably, the modulation functions of the modulator has three or more distinct levels of contrast.

The invention is also useful for monitoring stability of tunable radiation sources, such as lasers. A beam of radiation from at least one of the sources is diffracted to form an image onto a plane. Hence, a change of wavelength of the radiation from the source will cause the image to move on the plane. The beam of radiation is diffracted onto a modulator placed at the plane having a pair of filters at different radii from an axis for modulating amplitudes of wavelength components of the beam to encode the beam. The pair of the filters have modulating functions that are out of phase with respect to each other. The modulator is rotated about the axis so that the intensity of the encoded beam is proportional to the difference of intensities of radiation from the beam incident on the two filters. The encoded beam is detected and analyzed for monitoring the at least one excitation source. Thus, if the wavelength(s) of the radiation provided by the excitation source change, this will cause the image formed by the beam of radiation on the modulator to move, thereby causing the difference of intensities of radiation from the beam incident on the two filters comprising the pair to change, resulting in a change in the signal detected by the detector. Such change may be used in a feedback scheme to tune the source so that its wavelength(s) remain stable. Preferably, each of the modulation functions has three or more distinct levels of contrast. More preferably, where more than one pair of filters are present, the modulation functions of any given pair are substantially orthogonal to those of another pair and have the optimum 50% duty cycle. More than one excitation sources may be monitored at the same time.

Some sources of radiation are not point sources but have dimensions. This invention enables each portion of the radiation source to be monitored separately from other portions. This is particularly useful for analyzing different samples having different optical characteristics such as emission, fluorescence and scattering, where the different samples may be considered collectively as an extended source of radiation. Radiation from at least two portions of an extended source are imaged on a two-dimensional spatial radiation modulator. In the preferred embodiment, radiation from the extended source is collected such that the image is preserved and focused along a spatial axis by means of a cylindrical objective to form a one-dimensional spatial image onto the modulator. The modulator has filters with first modulating functions to encode the radiation from the at least two portions of the extended source. The encoded radiation or radiation derived therefrom is detected and analyzed so that the encoded radiation from each portion of the extended source is distinguishable from that from another portion. For some applications, it may be desirable to further spectrally analyze the encoded radiation from each of the portions of the source. This may be performed by directing the encoded radiation after encoding by the first modulator towards a diffraction element which disperses the radiation towards a second two-dimensional radiation modulator having filters with second modulator functions to further encode the beams with spectral information. The further encoded radiation is then detected and analyzed to derive the amplitudes of at least some spectral components of radiation from each of the portions of the extended source.

BRIEF DESCRIPTION OF THE DRAWINGS

FIG. 1A is a schematic side view of a spectrum analyzer to illustrate the preferred embodiment of this invention where the encoding is achieved by spatially varying the reflectance properties of the modulator.

FIG. 1B is a schematic view illustrating a view along the line 1B—1B in FIG. 1A of a portion of the analyzer in FIG. 1A.

FIG. 2 is a top view of a two-dimensional spatial radiation modulator suitable for use in the analyzer of FIG. 1A to illustrate an embodiment of the invention.

FIG. 3A is a graphical plot of a digitized replica of a smooth modulation function of one of the dispersed radiation filters in the modulator of FIG. 2 and an idealized modulation function from which the digitized modulation function of the filter of the modulator in FIG. 2 can be derived. Shown also in FIG. 3A is a digitized modulation function with only three levels of gray scale as a coarse digitized replica of the idealized modulation function of FIG. 3A.

FIG. 3B is a plot showing the effects of finite digitization on the nominally orthogonal amplitude wavefunctions, $\sin^2(m\theta+p\pi/4)$. The data points were obtained for a twenty-five channel system, where p=0, and m=1–25.

FIG. 4A is a graphical illustration of the digitized replica of a smooth modulation function of two of the dispersed radiation filters of the two-dimensional modulator of FIGS. 2 and 3 and the elongated dispersed image superposed upon the replicas to illustrate the invention.

FIG. 4 is a graphical illustration of the origin of the gray scales or levels of contrast to illustrate the invention.

FIG. 5 is a top view of a two-dimensional spatial radiation modulator to illustrate a modulator with four dispersed radiation filters for encoding different wavelength components using different modulation functions that are orthogonal to one another.

FIG. 6 is a top view of a two-dimensional spatial radiation modulator illustrating four spatial radiation filters for encoding four different wavelength components using the same modulation function.

FIG. 7 is a top view of a two-dimensional spatial radiation modulator which provides spatial radiation filters in the shape of serpentine bands, each of which is located between two corresponding concentric circles of different radii from the rotation axis to illustrate another aspect of the invention.

FIG. 8 is a top view of a two-dimensional spatial radiation modulator provided with a spatial radiation filter in the shape of a band whose width varies with the rotational angle about the rotation axis to illustrate yet another aspect of the invention.

FIG. 9 is a top view of a two-dimensional spatial radiation modulator provided with two spatial radiation filters having modulation functions at the same frequency but out of phase with respect to each other to illustrate another aspect of the invention.

FIG. 10A is a schematic view of a cross-modulation fluorescence excitation/emission analyzer to illustrate one more aspect of the invention.

FIG. 10B is a view of the analyzer of FIG. 10A along the direction 10B—10B in FIG. 10A.

FIG. 11A is a schematic view of a spectrum analyzer that includes a folding mirror whose position is controllable to illustrate a preferred embodiment of the invention.

FIG. 11B is a schematic view of the spectrum analyzer of FIG. 11A, illustrating in more detail the positioning of the folding mirror and other aspects of the analyzer.

FIG. 11C is a view of a portion of the spectrum analyzer of FIG. 11B along the line 11C—11C in FIG. 11B.

FIG. 12A is a schematic view of an apparatus for making the two-dimensional spatial radiation modulator of this invention.

FIG. 12B is a graphical illustration of the laser intensity that may be employed in the apparatus of FIG. 1A for making the two-dimensional modulator.

FIG. 14 is a top view of a two-dimensional spatial radiation modulator useful for monitoring the stability of tunable radiation sources.

FIG. 15A is a schematic view of an apparatus useful as an image analyzer and for analyzing the optical properties of different portions of an extended radiation source to illustrate another aspect of the invention.

FIGS. 15B and 15C are views taken along the lines 15B—15B and 15C—15C in FIG. 15A. For simplicity in description, identical components are labeled by the same numerals in this application.

DETAILED DESCRIPTION OF THE PREFERRED EMBODIMENT

Figure 13A:
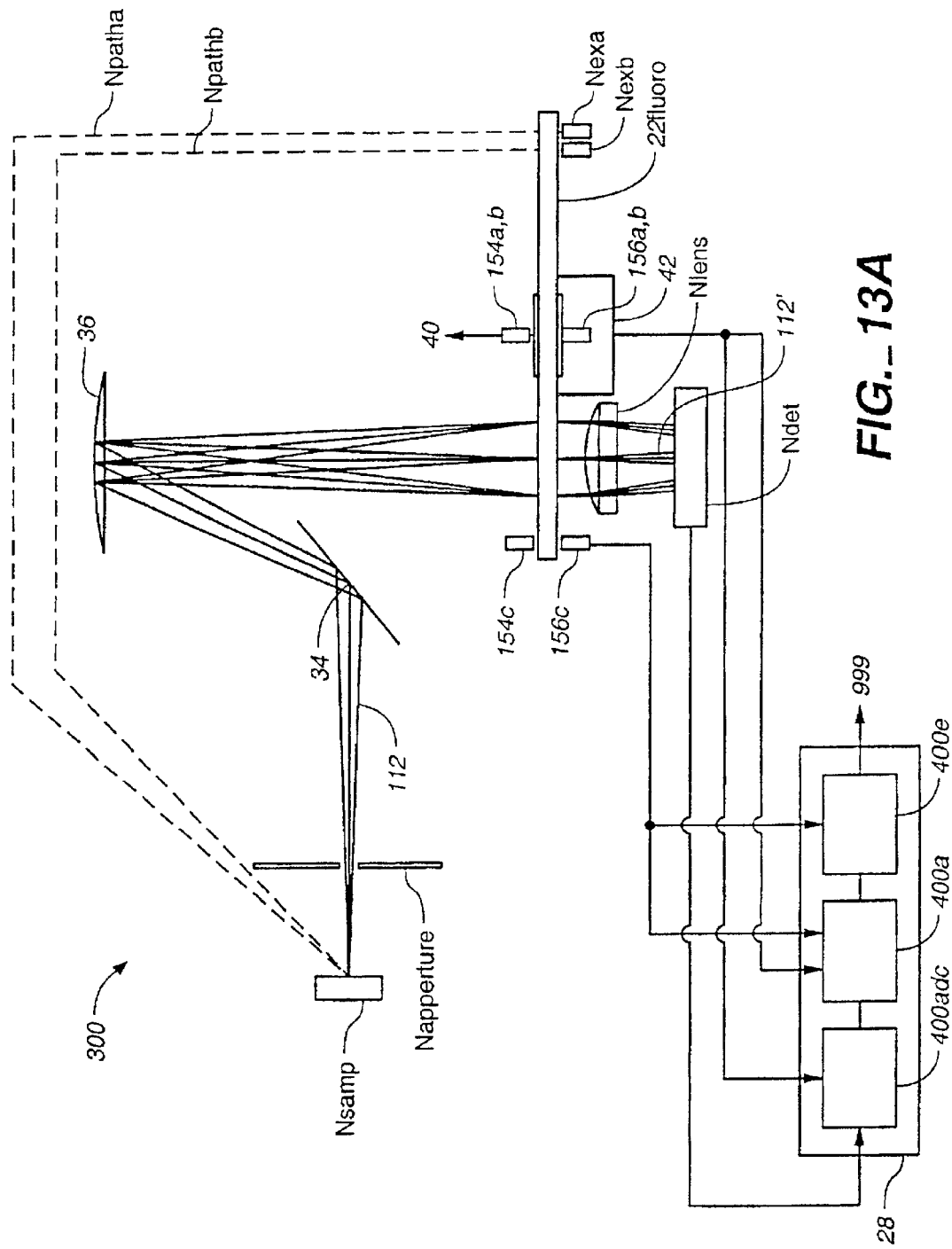
FIG. 13A is a schematic view of a spectrum analyzer useful for measuring the optical characteristics of a sample when excited by means of two distinct excitation sources.

FIG. 1A is a schematic view of a spectrum analyzer to illustrate a preferred embodiment of the invention where the encoding of the selected wavelength components is achieved by spatially varying the reflectance properties of the modulator. As shown in FIG. 1A, spectrum analyzer 20 includes a two-dimensional spatial radiation modulator 22 for modulating radiation from a source 24, which may be a broadband or multiple wavelength source such as a blackbody radiator, an incandescent source, a low-pressure isotope lamp, an x-ray excited sample, a Raman excited sample, a luminescent sample, a dye laser, a semiconductor laser, a glass laser, a gas laser and specifically, a carbon dioxide laser. After the radiation from source 24 has been encoded by modulator 22, the encoded beam is directed towards a detector 26 which provides, in response to the encoded beam, a detector output to an analyzing means such as a computer 28. An input radiation beam from source 24 is preferably passed through an entrance aperture 32 to a folding mirror 34 which reflects the radiation towards a concave diffraction grating (focusing grating) 36 which focuses the radiation onto modulator 22. Grating 36 also diffracts the input beam so that an elongated image dispersed according to wavelength is formed on the modulator. Preferably, the elongated image is formed with its length along a radial direction of the modulator 22 when the modulator is rotated about an axis 40 by means of a motorized platter 42. The dispersed radiation filters in or on modulator 22 encode the different wavelength components in the input beam by selectively reflecting the encoded components towards grating 36. Grating 36 in turn collects, reflects and focuses these components into an encoded beam towards folding mirror 34 which reflects the beam towards an exit aperture 44 to detector 26. Detector 26 detects the total intensity of the different encoded wavelength components in the encoded beam to provide a detector output to computer 28.

Preferably, each wavelength component is modulated by a corresponding filter having its modulation function. Thus, each filter on the modulator 22 forms a channel separate from the other filters/channels.

Computer 28 includes a decoding algorithm 400a, application specific analytical function 400d and an output 999. Preferably, the detectors analog output is sampled by an Analog-to-Digital Converter (ADC) 400adc which is triggered by an optical switch comprised of radiation source 154a and photodetector 156a. A second optical switch, comprised of radiation source 154b and photodetector 156b, provides the computer with a reference of 0 degrees to synchronize the ADC 400adc output with the decoding algorithm. As will be described below, as taught by this invention, the filters in or on modulator 22 are such that the optimum 50% duty cycle is retained and computer 28 can distinguish the intensity contribution of each wavelength component that is encoded by modulator 22, without having to solve a simultaneous system of equations. A periodic modulation function of a filter has a 50% duty cycle when the average value of the function over a period is 50%.

A third optical switch, comprised of radiation source 154c and photodetector 156c, is positioned such that the radiation emitted by 154c and collected by 156c is partially interrupted by the timing marks on modulator 22. Preferably, the timing-beam 154c/photodetector 156c combination used for quantifying positional error is positioned such that the timing marks obscure roughly half of the timing beam. The analog output of photodetector 156c provides the computer with information on platter wobble and alignment errors of the pattern of dispersed radiation filters on modulator 22 with respect to the axis of rotation 40. A sample cell (not shown) may be placed between the source and the entrance aperture or between the exit aperture 44 and the detector 26 for analysis of the sample in the cell.

FIG. 1B is a view of the entrance and exit apertures 32, 34 along the arrow 1B—1B in FIG. 1A. Also shown in FIG. 1A is an xyz axis, so that the view along the arrow 1B—1B is along the negative x axis.

FIG. 2 is a top view of a spatial radiation modulator with four different spatial radiation filters thereon to illustrate an embodiment of the invention. As shown in FIG. 2, modulator 22a includes four dispersed radiation filters 50a, 50b, 50c and 50d. These filters may be formed as a layer of radiation reflective material on top of a non reflective substrate, or as a layer of non-reflective material on top of a reflective substrate; alternatively, these filters may be formed as radiation transmissive areas in an opaque substrate or as a layer of opaque material on a transmissive substrate. For convenience in description, the spatial radiation filters are described to reflect radiation, it being understood that spatial radiation filters that transmit instead of reflect radiation may be used instead in each of the embodiments herein and such variations are within the scope of the invention.

In the preferred embodiment, filters 50a–50d have digitized modulation functions that are the digitized approximations or replicas of the function $\sin^2(m\theta+p\pi/4)$, wherein m is an integer and p can take on any one of the values 0, ±1, ±2 and ±3. Filter 50a, for example, is a digitized approximation of the modulation function $\sin^2(3\theta)$, filter 50b that of modulation function $\sin^2(5\theta)$, filter 50c that of $\sin^2(7\theta)$ and filter 50d that of $\sin^2(9\theta)$. Thus, the reflectance or transmittance of each of the dispersed radiation filters 50a–50d varies as a distinct function of the rotational angle $\theta$ around the rotational axis 40.

One possible digitized approximation 51 to the $\sin_2 2$ function with m=1 and p=0 is illustrated in FIG. 3A, which is obtained by rounding $\sin^2\theta$ up or down using 20 levels of gray scale. Also shown is the digitized approximation to the $\sin^2\theta$ with three levels of gray scale, 51x. In general, the more levels of gray scale the closer is the digitized approximation to the idealized modulation function $\sin^2\theta$ which is shown in dotted line 50'. Obviously, other digitized approximations of the idealized function 50' may be employed and are within the scope of the invention. The digitized approximations are adequate when it is possible to differentiate the contribution to the detector signal caused by the various wavelength components without having to solve a simultaneous system of equations, and may include a small but finite number of corrections to compensate for the effects of digitization.

FIG. 3B is a plot showing the effects of finite digitization on the nominally orthogonal amplitude wavefunctions, $\sin^2(m\theta+p\pi/4)$. The data points were obtained for a twenty-five channel system, where p=0, and m=1–25. A difference in the decoded amplitudes is defined by normalizing the twenty-five amplitudes to unity, decoding the amplitudes a first time, and then varying the amplitude of a single channel and decoding the amplitudes a second time. The average output error is given by the sum of the absolute difference in the first and second decoded amplitudes divided by the number of channels. In the FIGS. 61a, 61b and 61c are the resulting errors for varying the amplitude of the fundamental, m=1, the first harmonic, m=2, and the second harmonic, m=3 by +/−100%. The error for varying the amplitude of the m=11 term is also shown by 61d. The figure clearly illustrates the effects of finite digitization on the orthogonality of the modulation wavefunctions. Low end applications may only require 3–10 levels of contrast to meet a given accuracy specification, but high end systems, where significant accuracy is required may require 20 or more levels of contrast. For the most demanding applications, the first-order correction described below may be used to correct the decoded amplitudes for the interference.

As noted above, many of the advantages of the invention stem from the fact that it is possible to choose filter modulation functions that retain the optimum 50% duty cycle and to decode the detector signal to obtain the respective amplitudes of two or more wavelength components without having to solve a simultaneous system of equations. For many applications, this is possible where the modulation functions are roughly orthogonal. For some applications requiring very high accuracy, it may be useful to define substantial orthogonality as follows. The modulation functions of two dispersed radiation filters may be considered to be substantially orthogonal to each other when the following conditions are satisfied:

1) the error in the decoded amplitude of a first channel caused by changing the output of a second channel by 100% in either direction is less than one part in 1000 after applying the first-order correction as described below; and
2) the error in the decoded amplitude of the second channel caused by changing the output of the first channel by 100% in either direction is less than one part in 1000 after applying the first-order correction as described below.

The elongated wavelength dispersed image that is focused by grating 36 of FIG. 1A onto the plane of the modulator depicted in FIG. 2 to is dispersed along the x axis. One wavelength component is characterized by a center wavelength $(\lambda_2+\lambda_1)/2$ and a bandwidth $(\lambda_2-\lambda_1)$. Similarly, another wavelength component is characterized by a center wavelength $(\lambda_4+\lambda_3)/2$ and a bandwidth $(\lambda_4-\lambda_3)$.

FIG. 4 is a graphical illustration of the origin of the gray scales or levels of contrast to illustrate the invention. The curve N1 is the image intensity of 52a along the Y axis and curve N2 is the spatially modulated reflectance of the dispersed radiation filter 50a along the Y axis at an arbitrary rotational angle $\theta'$. The curve N3 is the product of curves N1 and N2 and is displaced along the vertical axis for clarity. From the figure, it is apparent that the relative reflectance of 50a at $\theta'$ is given by the ratio of the area under curve N3 to the area under curve N1. As modulator 22a is rotated about axis 40 as shown in FIGS. 1A and 2, wavelength component 52a is focused onto different portions of dispersed radiation filter 50a. Thus, as the modulator 22a is rotated, wavelength component 52a is encoded by the angle-dependent reflectance of dispersed radiation filter 50a. As shown in FIG. 4, the number of levels of contrast or gray scale are determined by the spatial resolution of the spatially modulated reflectance of filter 50a and the width of the dispersed image 52a along the Y axis.

At any given rotation angle, the total signal incident on detector 26 in FIG. 1A is given by the sum of the sub-signals arising from the selected wavelength components, 52a–52d, independently encoded by the angle-dependent reflectance of their corresponding dispersed radiation filters, 50a–50d, on modulator 22.

In reference to FIG. 2, image 52 is dispersed by wavelength along a radial axis with respect to the rotation of modulator 22a about axis 40, where the radial direction coincides with the x axis in FIG. 1A and FIGS. 4A, 4B. Theoretically, the modulation function of the filters can change in both the radial and azimuthal directions. In the embodiment of FIG. 2, the modulation functions of the filters 50a–50d change only in the azimuthal direction and not in the radial direction. Each of the filters 50a–50d occupies a two-dimensional annular area having a radius and a width. Therefore for simplicity, the width of the filters may be ignored and the modulation functions of the filters along the azimuthal direction regarded as the modulation functions of the two-dimensional filters. It being understood that spatial radiation filters with arbitrary widths are within the scope of the invention.

FIG. 5 is a top view of another embodiment 22b of the spatial radiation modulator of FIG. 1A. Modulator 22b is provided with four dispersed radiation filters 50a, 54a, 56a and 58a, where the modulation functions of the four filters are all digitized approximations of the function of the general form $\sin^2(m\theta + p\pi/4)$ described above in reference to modulator 22a of FIG. 2. In filters 50a–50d of modulator 22a of FIG. 2, p has the value 0 for all four filters, whereas m has the values 3, 5, 7 and 9. In modulator 22b of FIG. 5, however, the filters 50a, 54a, 56a, 58a have the respective p values of 0, 1, 2, and 3, whereas m is 3 for all four filters. In general, the dispersed radiation filters of any form in the modulator can be defined by specifying the values for m and p in the expression $\sin^2(m\theta + p\pi/4)$, where m is an integer and p can take on any one of the values 0, ±1, ±2 and ±3. Thus in general, the intensity of the encoded beam detected by detector 26 in FIG. 1A from a spatial radiation modulator such as modulators 22a, 22b or other modulators described in this application can be given in general by the following equation:

$$S(\theta) = \sum_m \sum_p a_{m,p} \sin^2(m\theta + p\pi/4) \quad (1)$$

where $S(\theta)$ is the intensity detected by the detector 26, and the summations include all of the m and p values corresponding to the filters present in a given modulator design. In equation 1 above, $a_{m,p}$ is the amplitude of the wavelength component that has been encoded by the dispersed radiation filter having a modulation function which is a digitized approximation or replica of $\sin^2(m\theta + p\pi/4)$. This invention permits one to retain the optimum 50% duty cycle and to determine the amplitudes of the wavelength components without solving a simultaneous system of equations as will be demonstrated below. In the summation process in equation 1, the filters present in a particular spatial radiation modulator may not include filters corresponding to all combinations of m and p values. This is exemplified in the modulator 22a of FIG. 2 where p takes on only the value 0, and in the modulator 22b of FIG. 5 where m takes on the value 3 throughout all the filters. In such event, the amplitude $a_{m,p}$ for filters that are not present in the modulator is simply 0.

As a further benefit, this approach enables the use of generalized approaches for the modulator drive system, data acquisition and the decoding algorithms. For example, the platter is rotated at a roughly constant frequency (as opposed to being stepped), the detectors analog output is sampled by an Analog-to-Digital Converter (ADC) 400adc which is triggered by an optical switch comprised of radiation source 154a, photodetector 156a and timing marks 150, a second optical switch, comprised of radiation source 154b, photodetector 156b and timing mark 152, provides the computer with a reference of 0 degrees to synchronize the ADC output with the decoding algorithm 400a. Hence, the decoding algorithm is compatible with any function defined in equation 1, and the number and identity (m, p and wavelength/bandwidth) of the modulated components, and the specific analytic functions to be performed on the decoded data are defined in application specific software. It is still further preferred that the application specific software be located on one side of the application specific hardware, the patterned disc.

The trigonometric functions $\sin^2(m\theta + p\pi/4)$ obey the following orthonormal relation.

$$\int_0^{2\pi} d\theta \cos(2m\theta + p\pi/2)\sin^2(n\theta + q\pi/4) = -\frac{1}{2}\pi\delta_{m,n}(\delta_{p,q\pm2}) \quad (2)$$

the amplitudes $a_{m,p}$ of the encoded wavelength components may be determined using the orthogonal properties of the trigonometric functions in accordance with equation 3 below:

$$a_{m,p} = -\frac{2}{\pi}\int_0^{2\pi} d\theta \cos(2m\theta + p\pi/2)S(\theta) \quad (3)$$

One complication introduced by the use of digitized approximations or replicas of the trigonometric function in the modulators 22a, 22b leads to a ringing phenomena at higher harmonics of the fundamental rotational frequencies and gives rise to interference terms which are proportional to the various amplitudes of the wavelength components in the different channels. However, for sufficiently high numbers of levels of contrast, residual interference can be ignored for many applications. Nevertheless, the orthogonality described by equation 2 and used in equation 3 above is inexact. As a result, it is preferable for the interference terms to be accounted for and the individual amplitudes corrected for the interference resulting from the amplitudes in the other channels, which naturally leads to a series of successively higher-order correction terms:

$$a_{m,p} = a_{m,p}^{(0)} + a_{m,p}^{(1)} + \ldots \quad (4)$$

where the zero-order amplitude coefficients are determined from $$a_{m,p}^{(0)} = \frac{2}{\pi}\int_0^{2\pi} d\theta \cos(2m\theta + p\pi/2)S(\theta) \qquad (5)$$

The first-order correction is given by $$a_{m,p}^{(1)} = \sum_n{}' \sum_q{}' A_{n,q}^{m,p} a_{n,q}^{(0)} \qquad (6)$$

where the primes on the summations indicate that the term where m=n and p=q is excluded.

The matrix elements $A^{m,p}_{n,q}$ are determined by sequentially decreasing or enhancing the amplitudes of the $a_{m,q}$ and measuring the changes in $a_{m,p}^{(0)}$. For example, if we identify $\delta a_{m,p}^{(0)}$ as the change in $a_{m,p}^{(0)}$ resulting from the change $\Delta a_{n,q}^{(0)}$ the imposed change in $a_{n,q}^{(0)}$, the corresponding matrix element is given by $$A_{n,q}^{m,p} = \frac{\delta a_{m,p}^{(0)}}{\Delta a_{n,q}^{(0)}} \qquad (7)$$

In practice, the integral shown in Equation 5 is replaced with a discrete summation over the number of steps M per rotation. On start-up, a three dimensional trigonometric look-up table $T_{m,p}^{j}$, is defined and initialized with the values of $\cos(2m\theta+p\pi/2)$ evaluated at the step interval for rotation.

$$T_{m,p}^{j} \equiv \frac{2}{\pi M}\cos(jm4\pi/M + p\pi/2) \qquad (8)$$

The zeroth-order amplitude coefficients are given by a summation of the discrete signal measurements multiplied by the corresponding entry in the trigonometric look-up table.

$$a_{m,p}^{(0)} = \sum_{j=1}^{m} T_{m,p}^{j} S(j) \qquad (9)$$

where S(j) is the ADC reading from the detector at the jth rotational step. At the end of a complete rotation, the first-order corrections are evaluated if required for a given application:

$$a_{m,p}^{(1)} = \sum_n{}' \sum_q{}' A_{n,q}^{m,p} a_{n,q}^{(0)} \qquad (10)$$

Note that if the amplitudes have not changed significantly since the last time the corrections were evaluated, the corrections need not be re-evaluated.

From the description above, it is seen that where M measurements are taken by rotation from 0° through 360° of the modulator, the value of j for the jth rotation step would range from 1 through M. The different combinations of m and p that are present on the modulator corresponding to the actual dispersed radiation filters that are present would give rise to a number N equal to the total number of channels present on the modulator. Upon start-up of the system using a particular modulator, a trigonometric look-up table $T_{m,p}^{j}$, is then constructed using equation 8 above. In order to obtain the first-order correction, the amplitude $a_{n,q}$ of the channel having a modulation function, which is an approximation of $\sin^2(n\theta+q\pi/4)$, is increased or decreased by $\Delta a_{m,p}^{(0)}$ and the changes in the amplitude $a_{m,p}^{(0)}$ is detected. Thus, if the change introduced in amplitude $a_{n,q}$, is $\Delta a_{n,q}^{(0)}$ the imposed change $\delta a_{m,p}^{(0)}$ caused by such introduction defines the corresponding matrix element $A^{m,p}_{n,q}$ as given by equation 7 above. This process therefore defines a matrix $A^{m,p}_{n,q}$ defined by equation 7. The amplitude $a_{n,q}$ may be altered by simply blocking the radiation that is reflected by the corresponding filter. At the end of a complete rotation, the first-order corrections may then be determined according to equation 10 above.

Thus, upon initialization of the system such as system 20 of FIG. 1A, a N row by M column matrix $T_{m,p}^{j}$ is calculated and its values stored in a N row by M column matrix look up table. Then when each of the M measurements at M values of 2 are obtained when the modulator is rotated from 0 to 360°, M, M being a positive integer and so is N, the computer derives the amplitude of each of the wavelength components (the coefficients $a_{m,p}$ in equation 1) in the N channels by summing the products of each of the M measurements with each of the M entries in the corresponding row in the look-up table for each such channel.

TRANSIENT DETECTION AND MOTOR CONTROL: Preferably, at each step j the detector signal is subtracted from the expected signal calculated using the last calculated zeroth-order amplitude coefficients defined by equation (9) above:

$$\Delta S^k(j) = S^k(j) - \left\{ \sum_{m_-} \sum_p a_{mp}^{(k-1)} \sin^2(j*m*2\pi/M + 2\pi/4) \right\} \qquad (11)$$

where $S^k(j)$ the detector signal measured at the jth step on the kth rotational period and the $a^{(k-1)}_{mp}$ are the zeroth-order amplitude coefficients calculated for the (k−1)th rotational period. The magnitude of $\Delta S^k(j)$ is used to detect transients which occur on a sub-rotational-period time scale. Preferably, when the magnitude of $\Delta S^k(j)$ exceeds a predefined threshold, the analyzers operating system increases the speed of the motor device 42 (such as by means of control signal from computer 28 to motor device 42), and when the magnitude of $\Delta S^k(j)$ drops below a second predefined threshold for a predefined extended period of time, the analyzers operating system decreases the speed of the motor device 42. In that way, the motor device 42 can be run a slow as possible, thereby increasing the operating life. Most preferably, $\Delta S^k$ is analyzed over a finite number of steps to determine its harmonic content, which in turn will be used as input by the decoding algorithm to compensate for the harmonic interference resulting from sub-period signal transients. Control of device 42 may be accomplished by means of computer 28 via a control signal line (not shown in the figures) to device 42.

FIG. 6 is a top view of a spatial radiation modulator 22c with four dispersed radiation filters therein with the same modulation functions $\sin^2(m\theta+p\pi/4)$, but located at different radii from the rotational axis 40 for encoding different wavelength components. This may be useful for the grouping of wavelengths into sub-groups, where the components of such wavelengths are collectively modulated to enhance the signal-to-noise ratio. As shown in FIGS. 2, 5 and 6, the dispersed radiation filters preferably comprise areas in the shape of annular segments at different radii from the rotational axis 40.

FIG. 7 is a top view of another spatial radiation modulator 70 to illustrate another aspect of the invention. As shown in FIG. 7, modulator 70 is provided with three continuous bands 72, 74, 76 which are serpentine in shape. Each of the bands 72, 74, 76 is located between two concentric circles of two different radii from the rotational axis 40. Band 74, for example, is located between two concentric circles 78, 79 at radii r1 and r2 from the rotation axis 40, where the two radii correspond to two different wavelengths $\lambda_1$ and $\lambda_2$. Thus, serpentine band 74 is of such a shape that its path oscillates between the two concentric circles at a modulation frequency given by the equation below:

$$r(\theta)=r1+(r2-r1)*\sin^2(m*\theta) \qquad (12)$$

where m is an integer, and 2 the rotational angle around the rotation axis 40.

The same is true for bands 72, 76. As will be evident from FIG. 7, band 74 is modulated at a frequency intermediate between the modulation frequencies of bands 72 and 76. Therefore, in the same manner as that described above for demodulation of the different wavelength components for the modulators 22a and 22b in FIGS. 2 and 5 above, the amplitude of the signal at the wavelength $(\lambda_1+\lambda_2)/2$ modulated at a frequency for band 74 between the two wavelengths can be obtained in a similar manner from a single measurement when the modulator is rotated by 360 degrees. By choosing an appropriate modulation frequency, it is possible to obtain the first derivative between $\lambda_1$ and $\lambda_2$, which may be useful for many applications.

FIG. 8 is a top view of yet another spatial radiation modulator 80 to illustrate another aspect of the invention. Modulator 80 is provided with a band 82 having a width that varies as a function of the rotational angle 2 around the rotation axis 40 at a selected frequency given by the equation:

$$\Delta r(\theta)=\Delta r1+(\Delta r2-\Delta 41)+\sin^2(m\theta) \qquad (13)$$

where m is an integer, and 2 the rotational angle around the rotation axis 40. The narrowest point is 82b and the widest point of the band is 82a. The detected amplitude of the wavelength component encoded by band 82 may be used to adjust the measurement results obtained using modulators 22a, 22b, 22c for correcting errors introduced by imperfections of the different components of the spectrum analyzer.

In the preferred embodiment, the dispersed radiation filters comprises two-dimensional patterns of alternating high and low transmittance or reflectance areas. Such pattern is a practical implementation of the digitized approximation or replica of a smooth periodic function such as the sine squared function. This is analogous to the half-toning process used in printing where black and white printed patterns are used to approximate intermediate gray scale levels. Thus as shown in FIGS. 2, 5 and 6, areas in the dispersed radiation filter with higher reflectance are shown with a higher concentration of black dots whereas areas of the filters with a lower reflectance are shown with fewer dots. As noted above, the black dots in these figures may indicate areas of high transmittance or reflectance, whereas the white background of the disc in such filter areas is substantially non-reflective, non-transmissive or opaque. The size of the dots in these filters defines the size of reflective or transmissive pixels. Instead of using a substrate with low reflectivity or transmission and a patterned layer of high reflectively material on the substrate as described above, (or forming patterned transmissive areas in an opaque substrate), the dispersed radiation filters may be constructed in a different manner. Thus a substrate with moderate reflectivity or transmission may be employed instead. Then in areas of the filters requiring high reflectivity or transmission, an area having such characteristics is formed (by deposit of a reflective layer or formation of transmissive area), and a layer of low reflectivity or translucidity material may be deposited in areas of the filter calling for such characteristics.

Instead of using patterns of alternating high and low reflectance or transmission, it is also possible to construct the modulators with substantially orthogonal modulation functions that are not digitized but are "analog" in nature. Thus neutral density filters may be used for this purpose, where the filters are formed by sputtering a light reflective material onto a transparent substrate. Depending on the thickness of the material sputtered, the amount of transmission can be controlled to achieve a particular substantially continuous and smooth transmittance function. Instead of using modulator 70 of FIG. 7 to obtain a first derivative between the wavelengths $\lambda_1$, $\lambda_2$, the same result may be obtained using the modulator 22a or 22b. The amplitude of the component at a first wavelength $\lambda_1$ encoded according to the function $\sin^2(m\theta+p_1\pi/4)$ and the amplitude of the component at a second wavelength $\lambda_2$ encoded according to the function $\sin^2(m\theta+p_2\pi/4)$ are obtained, where $P_1$—$P_2$ is an even integer and $p_1$ and $P_2$ having one of the values 0, ±1, ±2 and ±3. The computer then derives the difference between the modulated amplitudes of the components at $\lambda_1$ and $\lambda_2$, to obtain a first derivative value at $(\lambda_2+\lambda_2)/2$. This procedure can be generalized to include differences between arbitrary wavelength components.

FIG. 9 is a top view of a spatial radiation modulator 22ModDiff to illustrate another aspect of the invention. Modulator 22ModDiff is provided with three dispersed radiation filters, Na, Nb, and Ne, where the modulation function of the three filters are all digitized approximations of the general form $\sin^2(m\theta+p\pi/4)$ described above in reference to modulator 22a of FIG. 2. In modulator 22ModDiff, however, filters Na and Nb are designed to measure the difference in light intensity between a pair of wavelength components of a dispersed image. Filters Na and Nb form a pair, Na/Nb, having the same modulation frequency, (e.g. m=3), but are out of phase (i.e. different p values, where the difference between the p values of the two filters is an even integer) such that the signal resulting from the filter pair, Na and Nb, can be nulled by balancing the intensity of the light which is incident on Na and Nb. For instance, the light intensity can be balanced by varying the width of Na with respect to Nb. The resulting signal at the detector 26 is proportional to the difference in light intensity incident on Na and Nb. In this manner, the difference in the light intensity incident on the two filters can be measured directly, rather than inferring the difference by subtraction, an inefficient approach which wastes dynamic range of the analog to digital converter (ADC). In general terms, the filter pairs can be thought of as being comprised of a signal channel S (e.g. Na) and a reference channel R (e.g. Nb), and the invention measures S—R directly.

In many applications, the analytical function 400d in FIG. 1, requires knowledge of the absolute intensity of the signal S and reference R. Typically, the intensity of the reference R is stable for extended periods of time, and therefore, it is possible to measure the absolute intensity of R at some time t0 and then measure the difference S—R to obtain the absolute intensity of the signal S at some later time t1. In modulator 22ModDiff, filter Nc is designed to provide the absolute intensity at the midpoint between S and R. The frequency of Nc is chosen to be much higher than the frequency of the Na/Nb pair so that the signal originating from Nc can be filtered out using an appropriate low-pass analog filter 4001*pf* between the detector 26 and the analog to digital converter 400*adc*. Preferably, the low-pass analog filter 4001*pf* in FIG. 1 has a programmable cutoff frequency such that the signal originating from Nc can be switched in and out of the signal path to 400*adc* as needed. In this manner, the absolute intensity associated with the filter pair Na/Nb can be measured during a calibration cycle and subsequently, the difference S—R can be used to enhance the instruments resolution. In the alternative, the signal from detector 26 can be split into two signal paths with different low-pass filters, and a first ADC can be used to measure Na/Nb and a second ADC can be used to measure Nc.

Instead of using modulator 70 of FIG. 7 to obtain a first derivative between the wavelengths $\lambda_1$ and $\lambda_2$, the same result may be obtained using modulator 22ModDiff and locating Na and Nb adjacent to one another. The signal originating from the filter pair Na/Nb is equivalent to the first derivative of the incident intensity evaluated at $(\lambda_1+\lambda_2)/2$.

Preferably, one or more of the filter pairs has a modulation function that encodes the amplitude of the corresponding wavelength component difference so that the encoded component difference has three or more distinct levels of contrast over time when the modulator is rotated about the axis. More preferably, the modulation functions are smooth functions or digitized replicas thereof, obtained by rounding up or rounding down to a finite number of levels of contrast, and are of such nature such that the modulation functions of two filter pairs for modulating two different wavelength component differences have the optimum 50% duty cycle and are substantially orthogonal.

In cross-modulation fluorescence excitation/emission analysis, it is important to be able to lock the phase of the modulation functions used for the excitation beam to the phase of the modulation functions used for the emission beam. Still better, is the ability to control the relative phase between the modulation functions used for the excitation beam to the phase of the modulation functions used for the emission beam. Another aspect of the invention is directed to the recognition that, by placing the appropriate dispersion radiation filters on one side of the disc for encoding the excitation beam and the appropriate filters for emission analysis on the other side of the disc, where the filters on both sides of the disc are spatially correlated, the modulation functions for the excitation and emission modulation processes can be phase-locked and the relative phase controlled in a very simple manner.

FIG. 10A is a schematic view of a cross-modulation fluorescence excitation/emission analyzer 100. An excitation beam 102 from excitation source 104 is reflected by folding mirror 34 and reflected and focused by grating 36 as before towards the filters suitable for encoding the excitation beam on the top side of the modulator 106. After being modulated, the encoded excitation beam is reflected by the modulator 106 back towards the grating 36 which focuses the encoded excitation beam 108 towards a fluorescent sample 110 after reflection by mirror 34. The fluorescent beam 112 emitted by the sample in response to the encoded excitation beam is reflected by mirror 34' toward a second grating 36' which disperses and focuses the beam towards dispersed radiation filters adapted for fluorescence encoding present on the bottom side of modulator disc 106. After being modulated, the encoded fluorescent beam 118 is reflected, collected and focused by grating 36' towards a detector 120 after reflection by mirror 34'. As indicated in FIG. 10A, the fluorescent sample 110 is in the plane of the page or paper, the excitation source 104 is displaced into the page and the fluorescence detector 120 is displaced out of the page. The side view of analyzer 100 along the arrows 10B—10B in FIG. 10A is illustrated in FIG. 10B. As before, a computer 28 (not shown) connected to detector 120 is used to analyze a time-based signal generated by the detector. The patterns on the top side of disc 106 for encoding the excitation beam may have a pattern that is a digitized replica of $\sin^2(m\theta+p\pi/4)$ and that for encoding the emission beam is a digitized replica of $\sin^2(n\theta+q\pi/4)$ where m, n, p, q are positive integers. Computer 28 may then analyze the detector output to determine the amplitude of sum and difference frequency terms resulting from phase-locked cross-modulation according to the general trigonometric relation:

$$\sin^2(M\theta+\pi/4)*\sin^2(n\theta+q\pi/4)=(\tfrac{1}{8}*/\{\cos[2(m+n)\theta+p+q)\pi/2]+\cos[2(m-n)\theta+(p-q\pi/2]\} \quad (14)$$

In order to permit phase locking of the modulation functions of the filters on the top and bottom sides of disc 106, timing marks are provided that can be used for both sides of the disc. This is illustrated more clearly in FIGS. 2, 5, 6, 9, 13B, 14. As shown in all such figures, timing marks 150 at regular angular intervals in reference to axis 40 are provided on a circle near the circumference of the disc 22*a*, 22*b*, 22*c*, 22ModDiff, 22fluoro, and 22dwdm and a timing mark 152 is provided at a non-regular angular interval or position to mark the zeroth degree rotation angle.

As shown in FIG. 1A, the radiation sources 154*a* and 154*b* provide beams towards the location of time marks 150 and 152, respectively of the discs 22*a*, 22*b*, 22*c*, 22ModDiff, 22fluoro, and 22dwdm and photodetectors 156*a* and 156*b* on the other side of the disc is positioned to detect the radiation beam provided by source 154*a* and 154*b*, respectively. In the preferred embodiment, the substrate is transmissive to the timing beam and timing marks obstruct the timing beam. Alternately, the substrate is opaque to the timing signal and timing marks are milled or etched through substrate or the timing marks are reflective; and the sources 154*a*, 154*b* and 154*c* and the photodetectors 156*a*, 156*b* and 156*c* are preferably located on the same side of the modulator. Therefore, the output of photodetector 156*b* may supply through a connection to computer 28 to mark the zero rotational angle mark 152 and 156*a* may supply through a connection to also mark the instances of the passage of each of the timing marks 150. Such instances may be utilized by computer 28 for taking the M samples when the disc is rotated from 0 to 360E. In addition, a third timing-beam/photodetector combination, 154*c* and 156*c*, can be employed to measure the error in the absolute position of the dispersed radiation filters with respect to the axis of rotation. This positional error can arise from manufacturing process of the modulator (e.g., the pattern is printed off center, resulting in a purely periodic error), from the wobble of the spindle (resulting in a dynamic, periodic or non-periodic error), or from the thermal expansion of the modulator (resulting in a static radial error). Preferably, the timing-beam/photodetector combination used for quantifying positional error is positioned such that the timing marks obscure roughly half of the timing beam. The amplitude of the photodetector signal, which is a measure of the displacement of the modulator pattern with respect to the timing beam, is used as input to the application specific analytical function 400*d* to compensate for the effects of the error in the absolute position of the dispersed radiation filters with respect to the axis of rotation.

The above-described scheme for cross-modulation of excitation and emission can also be applied to cross-modulation of excitation and scattering. For this purpose, the fluorescent sample 110 is replaced by a sample that scatters the excitation beam. The scattered beam is then encoded and measured in the same manner as the emission beam described above. The above scheme using the timing marks 150, 152, sources 154a and 154b, and photodetectors 156a and 156b may also be used for controlling the timing of the taking of samples in other embodiments of this invention.

In reference to FIGS. 10A, 10B, the same timing marks and radiation source/photodetector system (not shown) described above may be employed in analyzer 100 for performing the encoding of the excitation beam and of the emission/scattered beam by reference to the same timing marks on the same disc.

FIG. 11A is a schematic view of a spectrum analyzer where the position of a folding mirror may be controlled to compensate for alignment and other errors in the system. Thus as shown in FIG. 11A, where the folding mirror is in position 34(1), the input beam 202 is not properly focused onto the modulator 22. For this purpose, the folding mirror 34 is connected to a translation-rotation stage controlled by a controller for moving the folding mirror to position 34(2), so that input beam 202' is properly focused onto the modulator 22. FIG. 11B is a schematic view of an analyzer with the translation stage and the feedback mechanism used for controlling the position of the folding mirror to dynamically align the system. The folding mirror is mounted on a stage which facilitates translations along the x axis and rotations about the y axis. The background dielectric spectra for various configurations of the folding mirror has been previously analyzed and recorded into software. The real-time background dielectric spectrum is compared with the stored spectra to gauge the misalignment of the dispersed image on the modulator. This information is transformed into a command set which is sent to the translation stage to reposition the folding mirror. The process is repeated as necessary for a given application. In reference to FIGS. 1A, 10B, the output of the detector 26 is sampled and then demodulated by decoding algorithm 400a, compared to background dielectric spectrum 400b by comparitor 400c, and then analyzed by analyzer 400c. Hardware driver 401 positions the folding mirror 34 in response to instructions from computer 28. FIG. 11B also shows a dedicated radiation source 154c and an analog detector 156c which is partially interrupted by the timing marks 150 to detect platter wobble or a misaligned pattern on the modulator. The amplitude of the modulated signal generated by the analog detector 156c in response to the rotation of modulator 22 is used as input to the hardware driver 401 to control the position of 34 to keep the diffracted image 52 centered on the modulator pattern.

FIG. 12A is a schematic view illustrating an instrument for making the spatial radiation modulators 22, such as modulators 22a–22c described above. For this purpose, a curing/ablation laser 250 is used. A photoresist 252 is placed on top of a gold coated substrate. The photoresist and the substrate are both rotated and the signal supplied to the laser is controlled in accordance with a predetermined laser intensity data shown in FIG. 12B. After the photoresist has been so exposed, the gold coated substrate may be processed in a conventional manner to form the patterns of alternating high and low reflectance and/or transmissivity on the gold coated substrate to form the spatial radiation modulators.

Figure 13B:
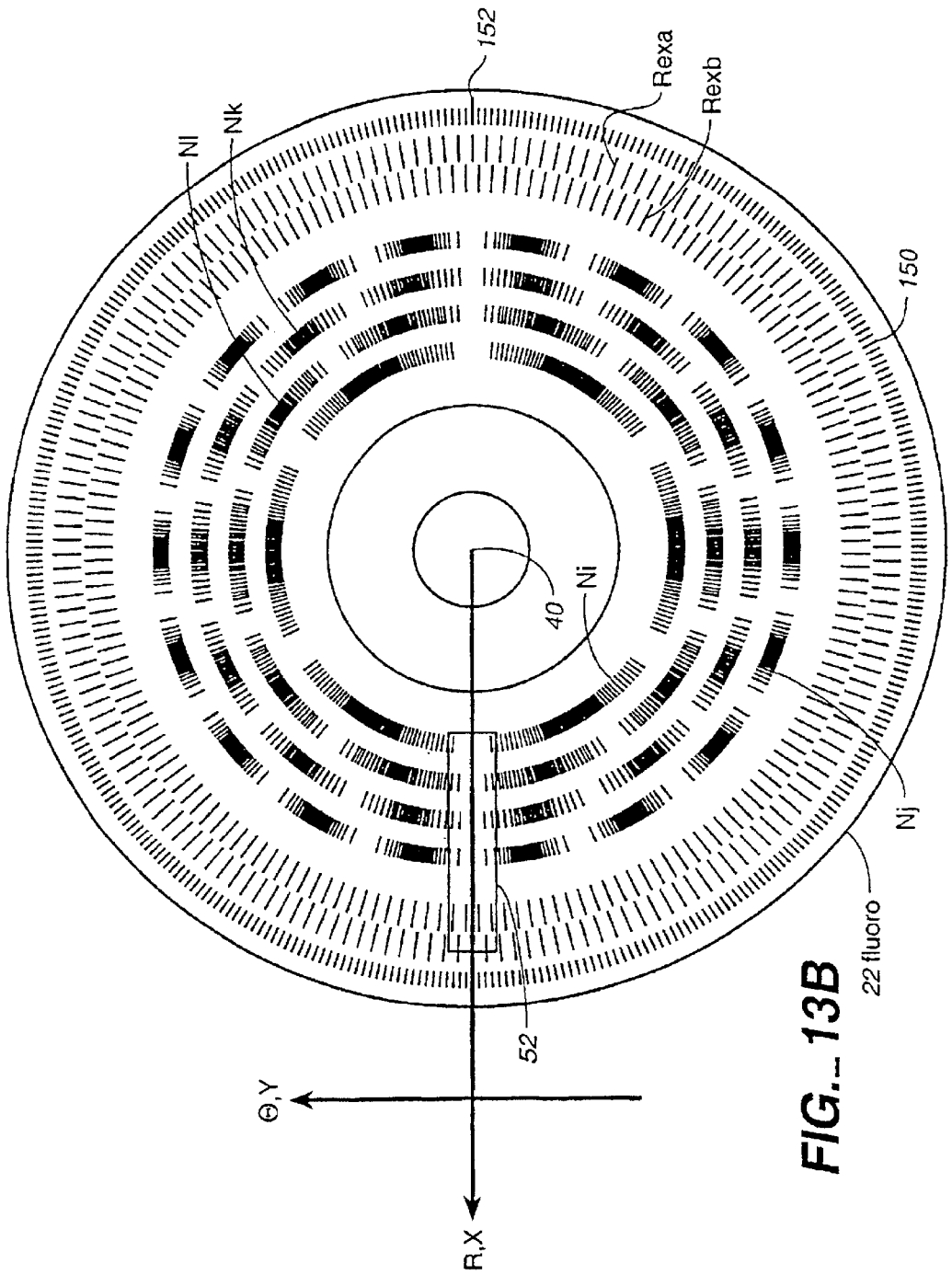
FIG. 13B is a top view of a two-dimensional spatial radiation modulator useful for the embodiment of FIG. 13A.

FIG. 13A is a schematic view of a second type of fluorescence excitation/emission analyzer 300. In this example, two distinct excitation sources, Nexa and Nexb, are independently directed toward the sample along optical paths Npatha and Npathb, respectively. The excitation sources may be gas lasers, glass lasers, laser diodes, light-emitting diodes, optical fibers, or lamp/filter combinations. Both Npatha and Npathb include transmission (or, in the alternative, reflection) through modulator 22fluoro at different radii, Rexa and Rexbi, respectively. As shown in FIG. 13B, a series of staggered optical gates centered at Rexa and Rexb alternately permit the transmission of radiation from either Nexa or Nexb, respectively, such that radiation from only one of the excitation sources is incident on the sample Nsamp at any given time. The radiation 112 emitted, transmitted or scattered by the sample in response to the alternating excitation beams is reflected by mirror 34 toward a focusing grating 36 which disperses and focuses the beam towards dispersed radiation filters Ni, Nj, Nk and Nl on modulator 22fluoro adapted for fluorescence where the encoding is achieved by spatially varying the transmission properties of the modulator. The two-dimensional spatial modulator positioned in the plane modulates amplitudes of the wavelength components emitted, scattered or transmitted by the sample in response to Nexa or Nexb to encode each component, such that the amplitude of each encoded component is a function of time. The encoded fluorescent beam 112' is collected by lens Nlens and directed towards detector Ndet. The time-based signal generated by the detector is separated into two sub-signals in a staggered repeating pattern such that each staggered sub-signal corresponds to the emitted or scattered radiation resulting from either Nexa or Nexb. The sub-signals are then independently analyzed to yield the amplitudes of the wavelength components of the emitted or scattered beam of radiation as a function of the excitation sources. Preferably, the binary amplitude modulation of the two excitation sources is synchronized with the modulation of the emitted or scattered radiation. More preferably, the binary amplitude modulation of the two excitation sources is performed by the same two-dimensional spatial modulator which modulates amplitudes of the wavelength components of the emitted or scattered radiation. Most preferably, the binary amplitude modulation of the two excitation sources is performed by two annular regions comprised of a series of gates having the same resolution as the timing marks, where every other gate is open. The phase of the open gates in the two annular regions are staggered such that only one gate is open at a time. The gates may simply be transmissive areas in an opaque substrate. The number of excitation sources and dispersed light filters was chosen for clarity, it being understood that arbitrary numbers of excitation sources and dispersed radiation filters are within the scope of the invention. The transmission mode of modulator 22fluoro was chosen for clarity, it being understood that a similar device with a reflective modulator is within the scope of the invention.

The arrangement in FIGS. 13A, 13B permits the emitted or scattered radiation or sample to be detected substantially simultaneously by means of two or more different excitation sources. This may be advantageous where radiation from either one of the two sources causes a change in the sample, so that where the sample is measured completely using one source and then measured using the other source in a sequence, the results of the measurements may differ depending on which source is first used in the sequential measurements. In such event, the arrangement of FIGS. 13A, 13B may be useful.

Each of the modulation functions of 22fluoro used to encode the emitted, transmitted or scattered radiation preferably has three or more distinct levels of contrast. The encoded beam is collected and directed towards a detector.

Preferably, at least two of the modulation functions for encoding two corresponding wavelength components have the optimum 50% duty cycle and are substantially orthogonal, so that the amplitudes of the two encoded components present in the total detector signal may be distinguished from each other without solving a system of simultaneous equations.

In FIG. 14 is a top view of another embodiment 22DWDM of the spatial radiation modulator of FIG. 1A, which is used as in a method for providing feedback to simultaneously control the center wavelengths of a number of tunable radiation sources. Spatial radiation modulator 22DWDM is comprised of two pairs of dispersed radiation filters, a first pair Ne, Nf and a second pair Ng, Nh. The filters in each pair are out of phase in a manner similar to filters Na, Nb described above in reference to FIG. 9 such that the signal resulting from either filter pair can be nulled, or made to vanish, by balancing the intensity of the light which is incident on the two filters. Preferably, one or more of the filter pairs has a modulation function that encodes the amplitude of the corresponding component difference so that the encoded component difference has three or more distinct levels of contrast over time when the modulator is rotated about the axis. Modulation functions of the type described above are suitable. More preferably, the modulation function of each of the filters in the two pairs of filters for modulating two different wavelength component differences is a smooth function or a digitized replica thereof, obtained by rounding up or rounding down to a finite number of levels of contrast, has the optimum 50% duty cycle, and the functions of the filter pairs in each pair are substantially orthogonal to each other.

The filter pairs are arranged on the surface of the modulator such that, when the tunable radiation sources are in the preferred configuration, there is no signal from any of the filter pairs. Any deviation of a given tunable source from the preferred configuration results in a signal in which the sign and amplitude of the decoded signal indicates the direction and magnitude of the displacement of the center wavelength, respectively. In such manner, the decoded signal can be used as a feedback mechanism to preserve the tunable sources in the optimum configuration. Thus, where temperature or other environmental changes cause the center wavelength to drift, the decoded signal may be used for tuning the tunable radiation source in order to maintain a stable and constant center wavelength, such as by changing the temperature of the source.

FIG. 15A is a schematic view of another embodiment of the invention used as an image analyzer for analyzing the spatial properties of an extended source of radiation, comprises an extended source 24' providing radiation. Source 24' is not a point source so that the radiation provided by different parts (e.g. S1, S2 shown in FIG. 15B) of the source comprises a plurality of spatial components which are spatially separated from one another. Radiation from the source 24' is collected such that the image of the source is preserved and focused along a first spatial axis with an image-preserving focusing element Ma to form a one-dimensional spatial image onto a plane. A two-dimensional spatial modulator 22 positioned in the plane modulates amplitudes of the spatial components to encode each component, such that the amplitude of each encoded component is a function of time. Each of the functions has three or more distinct levels of contrast. Preferably, at least two of the modulation functions for encoding two corresponding spatial components have the optimum 50% duty cycle, and preferably are substantially orthogonal to each other, so that the amplitudes of the two encoded components present in the total detector signal may be distinguished from each other without solving a system of simultaneous equations. The spatially encoded beam is collected by a second optical element Ma' and focused onto detector 26 and a time-based signal generated by the detector is analyzed by computer 28 which includes and application-specific algorithm 400e for interpreting spatial information.

FIG. 15B shows a top-down view of the image analyzer. The source 24' is depicted to have two spatial components from portions S1 and S2 of the source 24'. Radiation emitted by S1 and S2 is collected and focused onto the radial axis of modulator 22 using image-preserving focusing element Ma to form two images S1' and S2' respectively. Modulator 22 includes a number of spatial radiation filters (not shown but similar to those described above) which encode the reflected intensity from S1 and S2. The spatially encoded beam is collected by a second optical element Ma' and focused onto detector 26. Preferably, Ma, Ma' would be designed such that images S1'' and S2'' overlap at the detector plane 26. An extra lens Lensb may be used for this purpose, if necessary. FIG. 15C shows a side view of the image analyzer to illustrate the radial separation of images S1 and S2 along the radial axis of modulator 22. Where modulator have filters with modulation functions of the form $\sin^2(m\theta+p\pi/4)$, the output from mirror Ma' is spatially encoded by the same function.

Where one or more of the spatial components of an extended source has different wavelength components, the image analyzer described above can be combined with the spectrum analyzer shown in FIG. 1A using a geometry similar to that depicted in FIGS. 10A, 10B to facilitate simultaneous spectral-image analysis. In this embodiment, the detector 26 shown in FIG. 15A would be replaced with the aperture 32 of FIG. 1A, so that the spatially-encoded radiation $\sin^2(m\theta+p\pi/4)$ exiting the aperture would then be collected, dispersed and focused onto a second modulator to encode the beam with spectral information using modulation functions of the form $\sin^2(n\theta+q\pi/4)$ in a manner similar to that described above for analyzing radiation from source 24 through aperture 32 in FIG. 1A. The spatially-encoded and spectrally-encoded radiation would then be collected and focused onto detector 26. The signal generated by detector 26 would then be analyzed by computer 28 to determine the sum and difference frequency components (m±n) resulting from phase-locked cross modulation according to the general trigonometric relation in equation (14) above.

In the various embodiments described above, the two-dimensional spatial radiation modulator is rotated by means of a motor device or motorized platter 42. Preferably, the motor device or motorized platter 42 includes a precision spindle (not shown) which is coaxial with the rotation axis 40, a motor (not shown) and a belt (not shown) connecting the motor and the spindle, so that the motor may be replaced when it is worn out without affecting the alignment of the systems of this application.

Where the modulator 22 of FIG. 1A and the modulators of the various other embodiments in the other figures are designed to be rotated about axis 40 during the spectrum analysis, the filters on the modulators occupy annular regions of the disk as shown in the various figures of this application. This invention, however, is not limited to such implementation. Instead of annular regions, the filters, such as filters 50a, 50d may form four linear rows on the surface of the modulator, and the modulator may be reciprocated linearly along a direction substantially parallel to the rows of filters. The elongated image 52 is then projected in a direction with its length transverse (preferably perpendicular) to the direction of the rows of filters so that the image overlaps preferably all four rows of the filters. Such and other variations are within the scope of the invention.

While the invention has been described above by reference to various embodiments, it will be understood that different changes and modifications may be made without departing from the scope of the invention which is to be defined only by the appended claims and their equivalents. Thus, instead of using the specific optical elements as described, including the specific placement of a sample cell in the beam path, other optical elements may be used to collect, diffract, image and focus the radiation.

What is claimed is:

1. A system for analyzing radiation from an extended source having at least two spatial components that emit or scatter radiation, comprising:

first optics collecting and focusing radiation from said extended source to form at least two images along an encoding axis onto an encoding plane, said images corresponding to said spatial components;

a two dimensional spatial radiation modulator rotated about a rotation axis and positioned in said encoding plane so that said encoding axis is along a radial axis, said modulator having at least two radiation filters located at different radii from said rotation axis, said filters occupying distinct annular regions and modulating the intensities of corresponding spatial components with different modulation functions, to provide an encoded beam comprising at least two encoded spatial components as said modulator is rotated about said rotation axis;

a detector;

second optics for collecting and directing said encoded beam onto said detector, causing the detector to provide an output; and computer analyzing signals generated by said detector in response to said encoded beam.

2. The system of claim 1, wherein said extended source is an assembly of different samples.

3. A method for analyzing radiation from an extended source having at least two spatial components that emit or scatter radiation, comprising:

providing radiation from an extended source having at least two spatial components that emit or scatter radiation;

collecting and focusing radiation from said extended source to form at least two images along an encoding axis onto an encoding plane, said images corresponding to said spatial components;

positioning a two dimensional spatial radiation modulator in said encoding plane and rotating said modulator about a rotation axis so that said encoding axis is along a radial axis, said modulator having at least two radiation filters located at different radii from said rotation axis, said filters occupying distinct annular regions and modulating the intensities of corresponding spatial components with different modulation functions to provide an encoded beam comprising at least two encoded spatial components as said modulator is rotated about said rotation axis;

collecting and directing said encoded beam onto said detector; and analyzing signals generated by said detector in response to said encoded beam.

4. The method of claim 3, wherein said extended source is an assembly of different samples.

5. A radiation spectrum analyzer comprising:

at least one source providing a plurality of radiation components;

first optics collecting radiation from said source and forming an image onto an encoding plane, said image comprising at least two radiation components substantially separated from one another along an encoding axis;

a two dimensional spatial radiation modulator rotated about a rotation axis and positioned in said encoding plane so that said encoding axis is substantially along a radial axis, said modulator having at least one radiation filter pair to provide an encoded bean as said modulator is rotated about said rotation axis, said pair comprising two radiation filters located at different radii from said rotation axis for modulating the intensities of corresponding radiation components, said filters having modulation functions that are complementary to each other, to provide a single encoded component, each of said encoded components having an amplitude and phase which is determined by the relative intensity of said corresponding radiation components;

a detector;

second optics collecting and directing said encoded beam onto said detector, causing the detector to provide an output; and computer analyzing signals generated by said detector in response to said encoded beam.

6. The analyzer of claim 5, wherein the respective widths of said filters of said pair are engineered to substantially null the amplitude of said encoded component.

7. The analyzer of claim 5, wherein said filters of said pair are substantially adjacent to one another.

8. The analyzer of claim 5, wherein said first optics includes at least one refractive or diffractive element and said radiation components correspond to substantially distinct spectral components of said source.

9. The analyzer of claim 5, wherein said source is an extended source and said radiation components correspond to substantially distinct spatial components of said extended source.

10. A method for analyzing a radiation spectrum, comprising:

providing at least one source providing radiation;

collecting said radiation and forming an image onto an encoding plane, said image comprising at least two radiation components substantially separated from one another along an encoding axis;

positioning a two dimensional spatial radiation modulator in said encoding plane and rotating said modulator about a rotation axis so that said encoding axis is substantially along a radial axis, said modulator having at least one radiation filter pair to provide an encoded beam, said pair comprising two radiation filters located at different radii from said rotation axis for modulating the intensities of corresponding radiation components, said filters having modulation functions that are complementary to each other, to provide a single encoded component, said encoded component having an amplitude and phase which is determined by the relative intensity of said corresponding radiation components as said modulator is rotated about said rotation axis;

collecting and directing said encoded beam onto a detector; and analyzing signals generated by said detector in response to said encoded beam.

11. The method of claim 10, wherein said filters of said pair are substantially adjacent to one another, and said analyzing includes calculating the derivative of the image intensity with respect to position along said encoding axis evaluated at the border between said adjacent radiation filters.

12. The method of claim 10, wherein said forming includes refracting or diffracting said radiation, and said components correspond to substantially distinct spectral components of said source.

13. The method of claim 10, wherein said source is an extended source and said radiation components correspond to substantially distinct spatial components of said extended source.

14. A method for analyzing radiation, comprising:

providing a radiation beam comprising at least one selected radiation component;

collecting said radiation beam and focusing each said radiation component at a corresponding point along an encoding axis onto an encoding plane;

positioning a two dimensional spatial radiation modulator in said encoding plane and rotating the modulator about a rotation axis so that said encoding axis is substantially along a radial axis, said modulator having at least one radiation filter at a radius from said rotation axis, said filter modulating the intensity of a corresponding radiation component to provide an encoded beam comprising at least one encoded component;

collecting and directing said encoded beam onto a detector so that said detector provides an output; and analyzing signals generated by said detector, said analyzing including subtracting the detector output from an expected detector output as a function of the rotation angle of said modulator about said rotation axis to provide an output difference function, said analyzing further comprising analyzing said output difference function to detect sub-rotational period transients in the amplitude of one or more encoded components.

15. The method of claim 14, further comprising adjusting the speed of said rotation in response to said output difference function.

16. A method for analyzing radiation, comprising:

providing a first radiation beam comprising at least one selected radiation component;

collecting said first beam and focusing each said radiation component at a corresponding point along an encoding axis onto an encoding plane;

positioning a two dimensional spatial radiation modulator in said encoding plane and rotating the modulator about a rotation axis so that said encoding axis is substantially along a radial axis, said modulator comprising a pattern on a rotating substrate, said pattern having at least one radiation filter at a radius from said rotation axis, said filter modulating the intensity of a corresponding component to provide an encoded beam comprising at least one encoded component, said pattern further comprising at least one series of marks, said marks having optical characteristics substantially different from said substrate, said series of marks being substantially confined to an annular region of said modulator with respect to said rotation axis;

collecting and directing said encoded beam onto a detector so that the detector provides a data signal in response to said encoded beam;

analyzing said data signal, said analyzing including determining the modulated amplitude of said at least one encoded component;

positioning a second radiation source and second detector so that said marks modulate a beam from said second radiation source to said second detector to generate an alignment signal;

analyzing said alignment signal to detect wobble of said modulator and alignment errors of said pattern on said modulator.

17. The method of claim 16, further comprising dynamically positioning one or more optical elements in response to said alignment signal to minimize the undesired effects of said wobble and said alignment errors.

18. A system for monitoring radiation from at least one tunable radiation source, comprising:

a beam comprising at least one radiation component from a corresponding radiation source, said radiation component having an intensity and a center wavelength;

first optics collecting and dispersing said beam and focusing each said radiation source, said radiation component having an intensity and a center wavelength;

first optics collecting and dispersing said beam and focusing each said radiation component to form a corresponding image along an encoding axis onto an encoding plane;

a two dimensional spatial radiation modulator rotated about a rotation axis and positioned in said encoding plane so that said encoding axis is substantially along a radial axis such that a change in the center wavelength of said radiation component will cause said corresponding image to move substantially along said radial axis, said modulator having at least one radiation filter pair for modulating the intensity of a corresponding radiation component to provide an encoded beam comprising at least one encoded component, said pair comprising two radiation filters located at different radii from said rotation axis and having modulation functions that are complementary to each other such that the amplitude and phase of said encoded component is determined by the relative proportion of radiation incident on the two fillers;

second optics collecting and directing said encoded beam onto a detector; and computer analyzing signals generated by said detector in response to said encoded beam.

19. The system of claim 18, further comprising at least one control signal for adjusting a center wavelength of said at least one source in response to the signals generated by the detector to tune said at least one sources.

20. The system of claim 18, wherein said radiation filters comprising said pair are substantially adjacent to one another.

21. The system of claim 20, wherein the border between said adjacent radiation filters is substantially located at the radius which correspond to a nominal or desired center wavelength for said radiation source.

22. A method for monitoring radiation from at least one tunable radiation source, comprising:

providing a beam comprising at least one radiation component, each said radiation component from a corresponding distinct radiation source and having an intensity and a center wavelength;

optics collecting and dispersing said beam and focusing each said radiation component to a corresponding image along an encoding axis onto an encoding plane;

positioning a two dimensional spatial radiation modulator in said encoding plane and rotating the modulator about a rotation axis so that said encoding axis is substantially along a radial axis such that a change in the center wavelength of said radiation component will cause said corresponding image to move substantially along said radial axis, said modulator having at least one radiation filter pair for modulating incident radiation to provide an encoded beam comprising at least one encoded component, said pair comprising two radiation filters located at different radii from said rotation axis and having modulation functions that are complementary to each other such that the amplitude and phase of said encoded component are determined by the relative proportion of radiation from the beam incident on the two filters;

collecting and directing said encoded beam onto a detector; and analyzing signals generated by said detector in response to said encoded beam.

23. The method of claim 22, further comprising adjusting a center wavelength of at least one radiation sources in response to signals generated by said detector.

24. The method of claim 22, wherein said radiation filters comprising said pair are substantially adjacent to one another.

25. The method of claim 24, wherein the border between said adjacent radiation filters is substantially located at the radius which correspond to a nominal or desired center wavelengths for said radiation source.

26. A two dimensional spatial radiation modulator adapted to be rotated about a rotation axis to modulate at least two components of an incident radiation bean to encode said beam as said substrate is rotated about said rotation axis, said modulator comprising a substrate and at least one radiation filter pair, said pair comprising two radiation filters located at different radii from said rotation axis for modulating the intensities of corresponding radiation components, said filters having modulation functions that are complementary to each other to provide a single encoded component, said encoded component having an amplitude and phase which is determined by the relative intensity of said corresponding radiation components.

27. The modulator of claim 26, wherein said filters of said pair are substantially adjacent to one another.

* * * * *

UNITED STATES PATENT AND TRADEMARK OFFICE
CERTIFICATE OF CORRECTION

PATENT NO. : 6,897,952 B1
DATED : May 24, 2005
INVENTOR(S) : Thomas W. Hagler

It is certified that error appears in the above-identified patent and that said Letters Patent is hereby corrected as shown below:

Column 26,
Lines 20-22, delete "first optics collecting and dispersing said beam and focusing each said radiation source, said radiation component having an intensity and a center wavelength";
Line 42, change "fillers" to -- filters --;

Column 27,
Line 22, change "sources" to -- source --.

Column 28,
Line 7, change "wavelengths" to -- wavelength --; and
Line 10, change "bean" to -- beam --.

Signed and Sealed this

Tenth Day of January, 2006

JON W. DUDAS
*Director of the United States Patent and Trademark Office*